United States Patent
Yavuz et al.

(10) Patent No.: US 9,355,271 B2
(45) Date of Patent: May 31, 2016

(54) SYSTEM AND METHOD FOR DYNAMIC, NON-INTERACTIVE, AND PARALLELIZABLE SEARCHABLE SYMMETRIC ENCRYPTION

(71) Applicant: Robert Bosch GmbH, Stuttgart (DE)

(72) Inventors: Attila Altay Yavuz, Corvallis, OR (US); Jorge Guajardo Merchan, Pittsburgh, PA (US); Anvesh Ragi, Dallas, TX (US)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 14/506,045

(22) Filed: Oct. 3, 2014

(65) Prior Publication Data
US 2015/0143112 A1    May 21, 2015

Related U.S. Application Data

(60) Provisional application No. 62/026,201, filed on Jul. 18, 2014, provisional application No. 61/892,641, filed on Oct. 18, 2013.

(51) Int. Cl.
*H04L 29/06* (2006.01)
*G06F 21/62* (2013.01)
*H04L 9/00* (2006.01)
*G06F 17/30* (2006.01)

(52) U.S. Cl.
CPC ........ *G06F 21/6227* (2013.01); *G06F 17/3033* (2013.01); *G06F 17/30424* (2013.01); *H04L 9/00* (2013.01)

(58) Field of Classification Search
CPC ............ G06F 21/6227; G06F 17/3033; G06F 17/30424
USPC ......................................................... 713/165
See application file for complete search history.

(56) References Cited

U.S. PATENT DOCUMENTS

| | | | | |
|---|---|---|---|---|
| 7,484,092 B2 * | 1/2009 | Rajasekaran | ..... | G06F 17/30067 707/999.003 |
| 8,533,489 B2 * | 9/2013 | Roeder | ............. | G06F 17/30619 380/255 |
| 8,874,930 B2 * | 10/2014 | Chase | ................. | G06F 21/6227 380/28 |

(Continued)

OTHER PUBLICATIONS

Lipmaa, Helger et al., "Comments to NIST concerning AES Modes of Operations: CTR-Mode Encryption," Sep. 2000 (4 pages).

(Continued)

*Primary Examiner* — Hadi Armouche
*Assistant Examiner* — Hee Song
(74) *Attorney, Agent, or Firm* — Maginot Moore & Beck LLP

(57) ABSTRACT

A method of searching encrypted data includes generating with a client computing device a search index identifier corresponding to a search term in an encrypted search table and transmitting the search index identifier, a first single use key and a second single use key to a server. The method includes generating a set of decrypted data with the server for a set of data in an encrypted search table corresponding to the search index identifier using the first single use key to decrypt a first portion of the data and the second single use key to decrypt a second portion of the data. The method further includes identifying one or more encrypted files stored on the server that include the encrypted search term based on the decrypted data from the search table, and transmitting the encrypted files or encrypted file identifiers to the client computing device.

12 Claims, 5 Drawing Sheets

(56) References Cited

U.S. PATENT DOCUMENTS

| | | | | |
|---|---|---|---|---|
| 2009/0300351 | A1* | 12/2009 | Lei | G06F 17/30864 713/165 |
| 2010/0211782 | A1 | 8/2010 | Auradkar et al. | |
| 2011/0119481 | A1 | 5/2011 | Auradkar et al. | |
| 2011/0138190 | A1 | 6/2011 | Chase et al. | |
| 2013/0046974 | A1* | 2/2013 | Kamara | G06F 21/6218 713/165 |

OTHER PUBLICATIONS

Kamara, Seny et al., "Parallel and Dynamic Searchable Symmetric Encryption," Financial Cryptography and Data Security, Okinawa, Japan, Apr. 2013 (15 pages).

Song, Dawn Xiaodong et al., "Practical Techniques for Searches on Encrypted Data," IEEE Symposium on Security and Privacy, 2000 (12 pages).

Cash, David et al., "The Locality of Searchable Symmetric Encryption," Apr. 30, 2014 (23 pages).

Cash, David et al., "Dynamic Searchable Encryption in Very-Large Databases: Data Structures and Implementation," NDSS Symposium 2014, Feb. 22, 2014 (16 pages).

Stefanov, Emil et al. "Practical Dynamic Searchable Encryption with Small Leakage," NDSS Symposium 2014, Feb. 22, 2014 (15 pages).

Liesdonk, Peter Van et al., "Computationally Efficient Searchable Symmetric Encryption," SDM, 2010 (14 pages).

Pappas, Vasilis et al., "Blind Seer: A Scalable Private DDMS," SP '14 Proceedings of the 2014 IEEE Symposium on Security and Privacy, May 18, 2014 (16 pages).

Sedghi, Saeed et al., "Adaptively Secure Computationally Efficient Searchable Symmetric Encryption," Centre for Telematics and Information Technology, University of Twente, 2009 (17 pages).

Goh, Eu-Jin, "How to Search on Encrypted Data," Stanford University, Nov. 2003 (108 pages).

Kamara, Seny et al. "Dynamic Searchable Symmetric Encryption," Proceedings of the 2012 ACM conference on Computer and communications security, 2012 (24 pages).

Goh, Eu-Jin, "Secure Indexes," Cryptology ePrint Archive, Oct. 7, 2003 (18 pages).

Curtmola, Reza et al., "Searchable Symmetric Encryption: Improved Definitions and Efficient Constructions," 13th ACM Conference on Computer and Communications Security, 2006 (33 pages).

* cited by examiner

SYSTEM AND METHOD FOR DYNAMIC, NON-INTERACTIVE, AND PARALLELIZABLE SEARCHABLE SYMMETRIC ENCRYPTION

CLAIM OF PRIORITY

This application claims priority to U.S. Provisional Application No. 62/026,201, which is entitled "Method For Dynamic, Non-interactive And Parallelizable Searchable Symmetric Encryption With Small Leakage And Provable Security," and was filed on Jul. 18, 2014, the entire contents of which are hereby incorporated by reference herein. This application claims further priority to U.S. Provisional Application No. 61/892,641, which is entitled "Method For Dynamic, Non-Interactive And Parallelizable Searchable Symmetric Encryption With Secure And Efficient Updates," and was filed on Oct. 18, 2013, the entire contents of which are hereby incorporated by reference herein.

TECHNICAL FIELD

This disclosure is directed to the fields of cryptography and data security in general and, more particularly, to systems and methods for providing searchable symmetric encryption.

BACKGROUND

In modern networked computing systems, user data files are often stored in networked connected data server computing devices and accessed by remote client devices through a data network such as the Internet or another suitable network. For example, numerous network-connected data storage services, sometimes referred to as "cloud" storage services, provide network-connected data storage that client computing devices use to store data files. In some instances, a client stores data on a network storage system instead of keeping a copy of the file in a local data storage device such as a hard drive or solid-state memory device.

One disadvantage of online network services is that client data may be exposed to third parties, such as network intruders, who should not be permitted access to the client information. For example, a security vulnerability in the software of a network data storage server could enable an attacker to gain access to sensitive information in files that the client has stored on the server. As is known in the art, a client computing device preserves the privacy of data files that are transmitted to the data storage server by encrypting the data files prior to storing the data files on the network storage server. The client computing device uses one or more cryptographic keys to perform the encryption, and the users of the server computing device do not have access to the cryptographic keys. When the client uses an appropriate encryption method, an attacker or other party who gains unauthorized access to the encrypted files cannot produce the original contents of the files from the encrypted files in a practical manner.

While encryption enables a client computing device to maintain the privacy of data in encrypted files that are stored on a remote server, the encryption process also presents difficulty when the client attempts to search or otherwise identify the contents of the encrypted files. As described above, in some configurations the client does not store unencrypted copies of the data files in local storage both because the local data storage device capacity may be limited in comparison to the data storage server and because the server implements redundancy and backups to preserve the encrypted files from loss. Since most security models do not place complete trust in the server, the client cannot rely on the server to decrypt and search the files without divulging the contents of the files to potential attackers.

Existing techniques including Dynamic Symmetric Searchable Encryption (DSSE) enable clients to send search queries to a server to identify encrypted files that include key words used in a search query. In a DSSE scheme, the client generates and stores one or more symmetric cryptographic keys that are not shared with the server. The client uses one key or set of keys to generate a search database of search terms corresponding to the plain text contents of the encrypted files that are stored on the server. The server stores the search database and performs searches on the encrypted files in response to requests from the client. The structure of the search database and the requests from the client do not identify the search terms that are the subject of each search request. The client uses a different key or set of keys to perform the actual encryption of the files prior to sending the encrypted files to the server. In one embodiment the search terms include commonly used words in English or words in other languages that are included in the plain text versions of the encrypted data files. In other embodiments, search terms can take the form of searchable binary data segments that may be included in multimedia files such as recorded audio, photographic, or video data files. The server stores a search database that enables the server to identify files that contain a particular search term. In existing DSSE schemes, the client generates a search query for the server that does not divulge the search term to the server and the server uses the search database to identify encrypted files that include the search term without having to decrypt the encrypted files. The client optionally retrieves one or more of the encrypted files that include the search term to decrypt the encrypted files and perform additional processing without divulging the contents of the encrypted files to the server.

A DSSE scheme is defined mathematically with the following operations:

Definition 1

A DSSE Scheme is a Tuple of Nine Polynomial-Time Processes

DSSE=(Gen, Enc, Dec, SrchToken, Search, Add, AddToken, DelToken, Delete) such that:

K←Gen($1^k$): is a probabilistic symmetric key generation process that takes as input a security parameter k and outputs a secret key K.

($\gamma$, c)←Enc$_K$($\delta$, f): is a probabilistic function that takes as input a secret key K, an index $\delta$ and a sequence of files f. The term $\delta$ refers to a two-dimensional plain-text search table where each table row represents a search term and each column represents a file. An entry in the plain-text table entry $\delta$=[i, j]=1 indicates that the search term at row index i is present in a particular file at column index j, and $\delta$=[i, j]=0 indicates that the search term is not present in the file. The function Enc$_K$($\delta$, f) outputs an encrypted index $\gamma$ and a sequence of ciphertexts c.

$f_j$←Dec$_K$($c_j$): is a deterministic decryption process that takes as input a secret key K and a ciphertext $c_i$ and outputs a file $\tau_w$←SrchToken (K, w): is a (possibly probabilistic) encryption process that takes as input a secret key K and a search term w. It outputs an encrypted search token $\tau_w$.

id$_w$←Search($\tau_w$, $\gamma$): is a deterministic search process that takes as input a search token $\tau_w$ and an encrypted index $\gamma$. It outputs a sequence of identifiers id$_w$⊆c.

$\tau_f \leftarrow \text{AddToken}(K, f_{id})$: is a (possibly probabilistic) process that takes as input a secret key K and a file $f_{id}$ with identifier id to be added. It outputs an addition token $\tau_f$.

$(\gamma', c') \leftarrow \text{Add}(\gamma, c, \tau_f)$: is a deterministic process that takes as input an encrypted index $\gamma$, a sequence of ciphertexts c, an addition token $\tau_f$. It outputs a new encrypted index $\gamma'$ and sequence of ciphertexts c'.

$\tau_f' \leftarrow \text{DeleteToken}(K, f)$: is a (possibly probabilistic) deletion process that takes as input a secret key K and a file $f_{id}$ with identifier id to be deleted. It outputs a deletion token $\tau_f'$.

$(\gamma', c') \leftarrow \text{Delete}(\gamma, c, \tau_f')$: is a deterministic process that accepts an encrypted index $\gamma$, a sequence of ciphertexts c, and a deletion token $\tau_f'$ as input, and outputs a new encrypted index $\gamma'$ and new sequence of ciphertexts c'.

Some existing DSSE schemes operate with a chosen keyword attack 2 (CKA-2) level of security. A DSSE scheme that meets the criteria of CKA-2 security model has the following properties. The following definition of CKA-2 security is known to the art and is further documented in "Parallel and Dynamic Searchable Symmetric Encryption," by Seny Kamara and Charalampos Papamanthou. Let D be a DSSE scheme. D meets the CKA-2 security model definition if D has the following properties against a stateful attacker A using a simulator S where $\mathcal{L}_1$ and $\mathcal{L}_2$ are functions that describe the leakage of information to A:

Definition 2

$\text{Real}_A(k)$: the challenger runs $\text{Gen}(1^k)$ to generate a key K. A outputs a tuple $(\delta, f)$ and receives $(\gamma, c) \leftarrow \text{Enc}(K, \delta, f)$ from the challenger. The attacker, A, makes a polynomial number of adaptive queries by picking $q \in w, f_i$. If q=w is a search query, then A receives from the challenger a search token $\tau_s \leftarrow \text{SrchToken}(K, w)$. If $q=f_i$ is an update of type u, then the attacker also sends the helper information in f $o_{i,u} \leftarrow \text{UpdHelper}(i, u, \gamma, c)$ to the challenger and then receives from the challenger the update token $\tau_u \leftarrow \text{UpdToken}(K, f_i, \text{in f } o_{i,u})$. Finally, A returns a bit b that is output by the experiment.

$\text{Ideal}_{A,S}(k)$: The attacker A outputs a tuple $(\delta, f)$. Given $\mathcal{L}_1(\delta, f)$, S generates and sends a pair $(\hat{1}^3, c)$ to A. A then makes a polynomial number of adaptive queries by picking $q \in w, f_i$. If q=w is a search query, then the simulator S receives $\mathcal{L}_2(\delta, f, w, t)$. If $q=f_i$ is an update of type u, then S receives the updated output of $\mathcal{L}_2(\delta, f, w, t)$ for all keywords w that have appeared before in the adaptive queries.

The attacker A also sends in f $o_{i,u} \leftarrow \text{UpdHelper}(i, u, \gamma, c)$ to the simulator. The simulator returns an appropriate token $\tau$. Finally, A returns a bit b that is output by the experiment.

The DSSE scheme D is $(\mathcal{L}_1, \mathcal{L}_2)$-secure against adaptive dynamic chosen-keyword attacks if for all PPT adversaries A, there exists a PPT simulator S such that: $P_r[\text{Real}_A(k)=1]-\text{Pr}[\text{Ideal}_{A,S}(k)=1] \leq \text{neg}(k)$.

While existing DSSE schemes enable clients to search encrypted data without requiring divulging search terms or the contents of encrypted files to the server, existing DSSE schemes still have some drawbacks. In particular, existing DSSE schemes leak "size pattern" information, which is to say that an attacker can identify the overall number of search term to document pairs that are stored in the search database. Beyond drawbacks based on leakage of information, some existing DSSE schemes are also computationally intensive and require extensive data storage capacity to store the search databases. Consequently, systems and methods for performing DSSE that meet the CKA-2 security model criteria and further improve the privacy of client data beyond the requirements of CKA-2 while improving performance and search database storage overhead would be beneficial.

SUMMARY

In one embodiment, a method of searching encrypted data has been developed. The method includes generating with a client computing device a search index identifier using a predetermined encryption process to generate an encrypted key using a first secret cryptographic key and a predetermined hash function to generate the search index identifier from the encrypted search term, generating with the client computing device a first single use cryptographic key with reference to a second secret cryptographic key, and a first counter value associated with the search index identifier, generating with the client computing device a second single use cryptographic key with reference to a second secret cryptographic key, and a second counter value associated with the search index identifier, transmitting with the client computing device the search index identifier, first single use cryptographic key, and second single use cryptographic key to a server computing device, identifying with the server computing device a first set of encrypted data in a search table with reference to the search index identifier, generating with the server computing device a set of decrypted data from the first set of encrypted data, the server computing device using the first single use cryptographic key to decrypt a first portion of the first set of encrypted data and the server computing device using the second single use cryptographic key to decrypt a second portion of the first set of encrypted data, identifying with the server at least one encrypted file stored in a memory associated with the server computing device with reference to the decrypted data, the at least one encrypted file containing an encrypted representation of the search term, transmitting with the server computing device a plurality of file identifiers corresponding to the identified encrypted files to the client computing device, generating with the server computing device a second set of encrypted data from the decrypted set of data from the search table and the second single use cryptographic key, and storing the second set of encrypted data in the search table in associated with the search index identifier to replace the first set of encrypted data in the search table.

In another embodiment, a method of updating an encrypted search database for an encrypted file has been developed. The method includes identifying with a client computing device a plurality of search terms in a file stored in a memory of the client computing device, generating with the client computing device a plurality of encrypted search terms from the plurality of search terms using a first cryptographic key, generating with the client computing device a plurality of search index identifiers corresponding to each search term in the plurality of encrypted search terms using a predetermined hash function, each search index identifier in the plurality of search index identifiers corresponding to a set of entries in an encrypted search table, generating with the client computing device a plain-text set of data corresponding to a plurality of entries for the file in the search table, the set of data including a first plurality of entries corresponding to the search index identifiers having a first value indicating that a corresponding search term is present in the file and a second plurality of entries having a second value indicating that a corresponding search term is not present in the file, generating with the client computing device an encrypted set of data from the plain-text set of data corresponding to entries for the file in the search table, encrypting with the client computing device contents of the file using a file encryption/decryption key stored only in a memory associated with the client computing device, encrypting with the client computing device a file identifier of the file, transmitting with the client computing device the encrypted set of data, the encrypted file identifier, and the encrypted file to a server computing device, updating with the server computing device the search table with the encrypted set of data in a memory associated with the server computing device, storing with the server computing device the encrypted file in the memory associated with the server computing device.

DETAILED DESCRIPTION OF THE DRAWINGS

Figure 1:
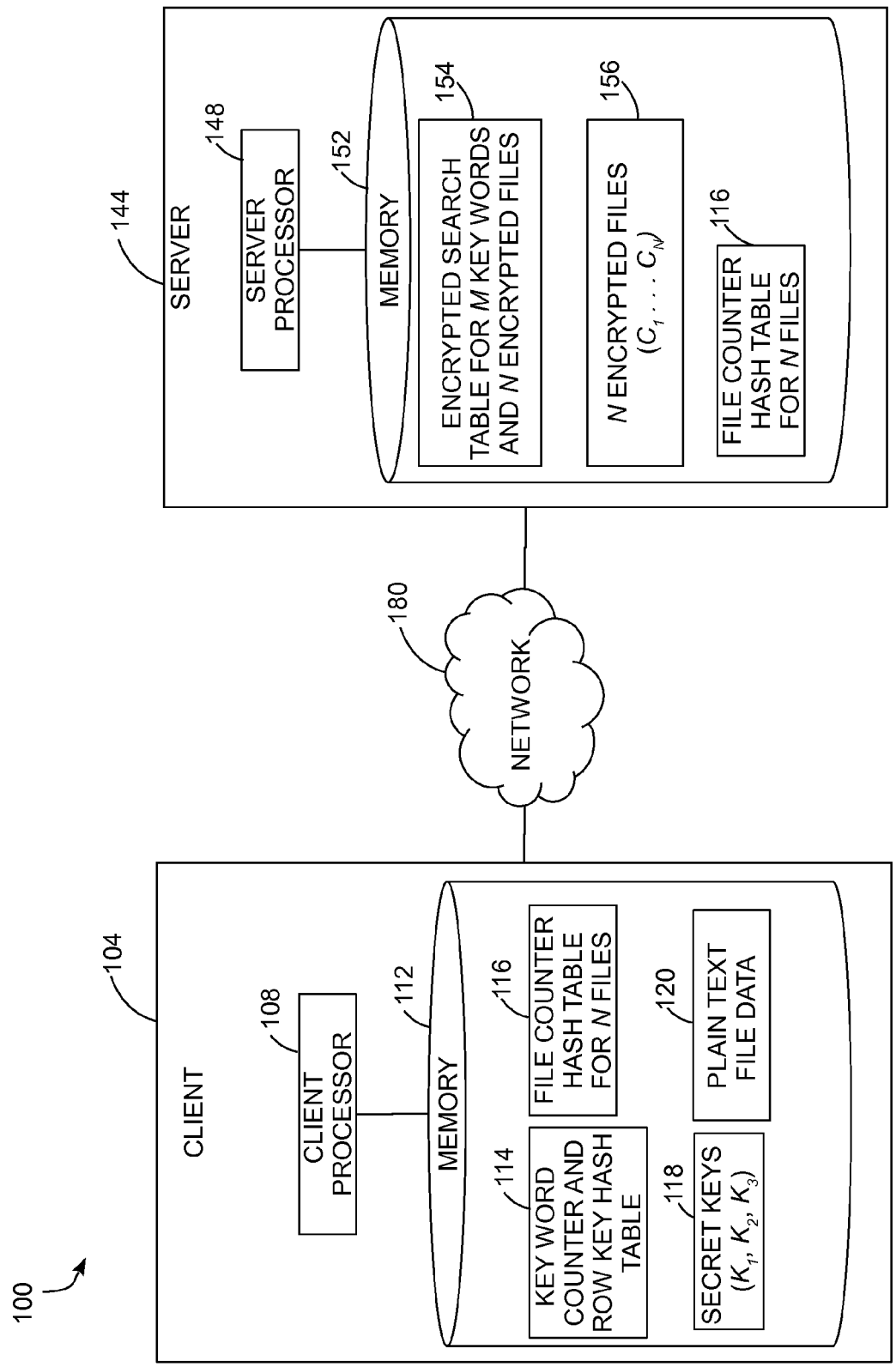
FIG. 1 is a diagram of an illustrative embodiment of a system that implements dynamic searchable symmetric encryption (DSSE).

For a general understanding of the environment for the device disclosed herein as well as the details for the device, reference is made to the drawings. In the drawings, like reference numerals designate like elements.

As used herein, the terms "single use cryptographic key" or "single use key" are used interchangeably and refer to a cryptographic key that is generated in a "fresh" state and used to encrypt one or more sets of data and are used to decrypt the encrypted data only once before the single use cryptographic key is considered "stale". As described in more detail below, the term "fresh" refers to a single use cryptographic key that a client computing device generates for the purposes of encrypting search index data that are associated with a single search term in a larger encrypted search table. The single use key remains fresh as long as the client retains the secrecy of the single use key. In particular, the single use key remains fresh as the client encrypts search table data associated with the search term for one or more files and does not transmit the single use key to a server computing device that stores the encrypted search table. To perform a search operation, the client transmits the single use key to the server and the server uses the single use key to decrypt the encrypted search table data to perform the search. The term "stale" refers to a single use cryptographic key once the server has received the single use cryptographic key from the client. The server uses the stale key for a re-encryption operation and then deletes the stale key from memory. After transmitting the single use key to the server, the client does not use the stale single use cryptographic key for any further encryption operations. Instead, the client computing device generates another fresh single use cryptographic key that is associated with the search term for additional encryption operations until the client performs the next search for the search term.

In the discussion below, reference is made to counters that are associated with search terms that a client computing device queries in a search database located in a remote server computing device and in association with files that the client encrypts and stores in the server. A counter refers to a numeric value that is initialized to a predetermined value (e.g. 0 or 1) and is subsequently changed (often by adding 1 to the counter value) when the client computing device or server computing device performs an encryption process. For example, as described in more detail below, the client computing device generates a plurality of single use encryption keys using a secret cryptographic key, a numeric index associated with an encrypted search term, and a counter value associated with the encrypted search term. To generate new and different single use cryptographic keys for the same search term using a single secret key, the client increments the counter value and appends the incremented counter value to the numeric index associated with the search term. Consequently, the encryption key always encrypts a different set of data to generate the plurality of single use keys. A similar process occurs for encryption of a set of search index data that is associated with a file. When the client updates the file to add or delete one or more search terms, the client increments a counter value that is associated with the file. The client then uses a secret cryptographic key to encrypt each entry in the search index using a concatenated set of data including the value of the entry (e.g. 0 if the search term is not present in the file, 1 if the search term is present in the file), a numeric index associated with a hashed value of an encrypted version of the file identifier, and the counter value. When the client changes the file, the client also increments the counter to guarantee that each entry in the search index is re-encrypted using a different set of data. This prevents an attacker from comparing a previous version of the encrypted file index to a new version of the encrypted file index to identify the search terms that changed when the client updated the file.

As used herein, the term "random oracle" refers to a function H(x) that takes an input x and generates an output of a predetermined number of bits that appear to be random. The input x can have an arbitrary length of one or more bits. The random oracle H is a type of one-way or "trapdoor" function where the output cannot be used to reconstruct the original input x in a practical manner. The random oracle function H returns the same output when invoked for a given input value. In the examples below, a random oracle function H generates a single-bit output that is used for encryption and decryption of single-bit entries in a search table. However, other random oracle embodiments generate outputs with a larger number of bits. A practical embodiment of a random oracle function is a one-way hash function such as the SHA2 or SHA3 families of cryptographically secure hash functions. Digital processing devices including microprocessors and controllers implement the cryptographically secure hash functions and the other functions of the random oracle using stored program instructions and, in some embodiments, dedicated processing hardware the performs some or all of the functions of the random oracle. Cryptographically secure hash functions typically produce large outputs (e.g. 256 or 512 bit outputs). A single-bit random oracle, however, truncates the output to use only one bit, such as the most significant or least significant bit in the output of the hash function to produce single-bit randomized output.

As used herein, the term "search index identifier" refers to a numeric datum that is used to identify a particular set of data in a search table that corresponds to entries for a search term. For example, a numeric row number of an encrypted search table identifies a row of encrypted search table entries that each store an encrypted identifier that indicates if a particular encrypted file includes an encrypted representation of the search term that corresponds to the search index identifier. As described in more detail below, a server stores an encrypted search table and receives search requests from a client that only include the numeric search index identifier instead of the actual search term. The server identifies a set of encrypted search table data using the search index identifier, decrypts the set of search table data, and returns file identifiers and file contents of encrypted files that include the search term. The search table is a two-dimensional table that is also referenced with a file index identifier. As used herein, the term "file index identifier" refers a numeric datum that is used to identify a particular set of data in the search table that corresponds to one encrypted file. In the encrypted search table, the set of data corresponding to a file includes encrypted table entries that, after decryption, identify the presence or absence of a set of search terms in one particular file.

FIG. 1 depicts a client-server system 100 that implements a dynamic symmetric searchable encryption (DSSE) process to enable a client computing device (client) 104 to search encrypted files that are stored in a memory of a server computing device (server) 144. The system 100 includes the client 104, the server 144, and a network 180, such as a local area network (LAN), wide area network (WAN) or other suitable data network that enables communication between the client 104 and server 144.

The client 104 includes a client processor 108 and a memory 112. The processor 108 is a microprocessor or other digital logic device that executes stored program instructions and the memory 112 includes both volatile data storage devices such as random access memory (RAM) and non-volatile data storage devices such as magnetic disks and solid state drives. Some embodiments of the client processor 108 include parallel execution hardware that incorporates multiple processing cores or other parallel processing components to perform file encryption and decryption, search term encryption, file update operations, and other operations that are implemented as part of a DSSE scheme concurrently. Examples of client computing devices include portable and desktop personal computers (PCs), smartphones, tablet computing devices, wearable computing devices, and any other suitable digital computing device.

In the client 104, the memory 112 stores a static hash table 114 of counter values for search terms 114 that are used in searches and another static hash table 116 of counter values for encrypted files. A counter value in table 114 corresponds to a search term that the client 104 uses as a subject of a search in the encrypted files 156 that are stored in the server memory 152. The encrypted files 156 include encrypted representations of at least some search terms that the client requests from the server 144, although the server 144 is unable to extract plain text search terms from the encrypted files 156. The client processor 108 increments the counter associated with each search term after performing a search for the corresponding search term in the server 144. The client processor 108 increments the counter associated with a file after performing an update that adds or removes at least one search term from the file before encrypting and transmitting the file to the server 144. The client memory 112 stores secret key data 118 including the keys $k_1$, $k_2$, and $k_3$. In the embodiment of FIG. 1, the secret keys $k_1$ is symmetric cryptographic key that is generated using an appropriate symmetric key generation function $Gen(1^\kappa)$. The key $k_1$ is suitable for performing encryption and decryption of file data using a block cipher encryption/decryption scheme, such as the Advanced Encryption Standard (AES) or other suitable schemes. As described below, the key $k_1$ is a secret key known only to a client computing device and is used to encrypt data files prior to transmission to the server 144 and decrypt data files after reception from the server 144. The cryptographic keys $k_2$ and $k_3$ are random numbers that are selected from a sufficiently large numeric space (e.g. a 128 bit space with $2^{128}$ potential values) that prevent an attacker from guessing the values of the keys in a practical manner. The keys $k_2$ and $k_3$ are also secret keys that are known only to the client computing device 104. The key $k_2$ is used to encrypt search terms and file names of the files as part of a process for generating an encrypted search table that is stored in the server 144. The key $k_3$ is used for the generation of single use cryptographic keys that the client 104 uses to encrypt search table data during a file update operation and that the server 144 uses to decrypt and re-encrypt sets of data in the search table during a search operation. The plain text file 120 in the client memory 112 is an example of one or more data files that are held in the memory of the client computing device 104.

During operation, the client computing device 104 encrypts one or more plain text files 120 and generates encrypted search term indices for the files using the key $k_2$. The client 104 transmits the encrypted version of the plain text file 120 and the search term indices to the server 144. The client 104 also identifies encrypted files that match specific search terms on the server 144, and retrieves the encrypted files. The client 104 decrypts the retrieved files, and optionally updates the files to add or delete search terms. The client 104 then re-encrypts the file, generates an updated set of encrypted search term indices, and transmits the updated encrypted file and updated encrypted search term indices to the server 144.

The server 144 includes a server processor 148 and a memory 152. The processor 148 in the server 144 is a microprocessor or other digital logic device that executes stored program instructions to perform searches and file storage and retrieval services for the client 104. While not a requirement, in some embodiments the server processor 148 has greater computational power than the client processor 108. Some embodiments of the server processor 148 include parallel execution hardware that incorporates multiple processing cores or other parallel processing components to perform searches and other operations that are implemented as part of a DSSE scheme concurrently. The memory 152 in the server 144 includes both volatile data storage devices such as random access memory (RAM) and non-volatile data storage devices such as magnetic disks and solid state drives. While not a requirement, in some embodiments the server memory 152 has a larger capacity than the client memory 112 to enable the server memory 152 to store a large number of encrypted files. While FIG. 1 depicts a single client 104 for illustrative purposes, in many embodiments the server 144 stores data for multiple client computing devices. Each client computing device generates and stores a client-specific encrypted search table and encrypted files in the server memory 152.

The server memory 152 stores an encrypted search table 154, a set of encrypted files 156, and a copy of the file counter hash table 116 that is also stored in the memory 112 of the client 104. The encrypted search table is a two-dimensional table with one dimension corresponding to individual search terms in the encrypted files and another dimension including entries that correspond to individual files in encrypted files 156. In the illustrative embodiments described herein, each row of the table 154 includes encrypted entries for a single search term that is either present or absent from a particular file, and each column of the table 154 includes entries that correspond to different search terms that are either present or absent from a single file. Search queries for different search terms address the table 154 through numeric search indices and the server 144 cannot identify the underlying search term based on only the search index. As described in more detail below, the client 104 converts a search term to an appropriate numeric index for the table 154 using an encryption process that prevents the server 144 from identifying the contents of the search term from the search index number. The server 144 uses the search index value to select a row of encrypted search data from the table 154. The client 104 also generates a two single use cryptographic keys that the server 144 uses to decrypt the contents of the selected row of the table 154 and re-encrypt the contents of the selected row after identifying files that include the search term associated with the row.

In the system 100, the client 104 communicates with the server 144 through a network 180. Both the client 108 and server 144 include network communication devices, such as wired network devices (e.g. Ethernet or other suitable wired network interface) and wireless network devices (e.g. Bluetooth or IEEE 802.11 wireless LAN and 3G or 4G wireless WAN). In the discussion below, the client 104 and server 144 are assumed to communicate using authenticated and encrypted communication processes that are known to the art and are not described in further detail herein. Thus, an eavesdropping computing device that monitors traffic through the network 180 cannot determine the contents of communications between the client 104 and server 144. An "attacker" refers to a computing device or entity that has access to the server 144 and the ability to read at least portions of the data stored in the server memory 152 in a manner that is not approved by the client 104. The attacker has a goal of extracting information about the N encrypted client files 156 to reduce or eliminate the privacy of the content of these files. The attacker also observes the contents of the encrypted search table 154 and data that are generated during operations in the server 144 to generate information about the encrypted files 156. The attacker is also presumed to have the ability to monitor network communications at the server 144 to circumvent the encryption of communication messages between the client 104 and the server 144. While the attacker can observe communications from the client 104, the attacker does not have direct access to the contents of the client memory 112.

Figure 2:
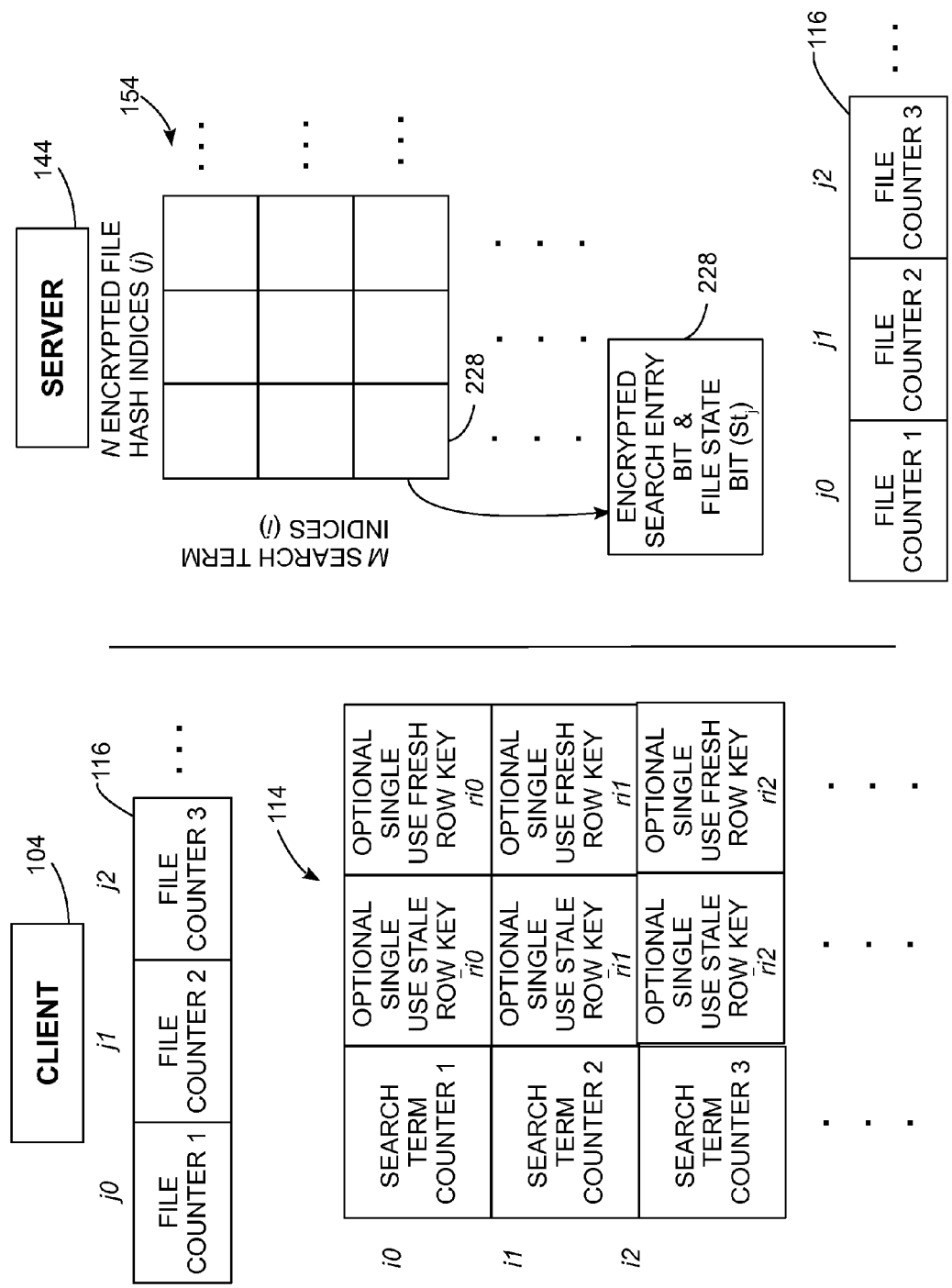
FIG. 2 is a diagram of search tables and indices that are used for implementing the DSSE processes in the system of FIG. 1.

FIG. 2 depicts hash tables and the search tables that are stored in the client memory 112 and server memory 152 in more detail. The client 104 stores the search term hash table 114 ($T_w$) and the file hash table 116 ($T_f$). The server 154 stores the encrypted search table 154 (I) and a copy of the file hash table 116 ($T_f$). During operation, the client 104 and server 144 each access entries the hash tables 114, 116, and 154 using numeric hash index values. As described in more detail below, the numeric index values for the search term hash table 114 and the row index of the encrypted hash table 154 correspond to hashed values of encrypted search term data. The numeric index values for the file hash table 116 and the column index of the encrypted hash table 154 correspond to hashed values of encrypted file identifiers for the files that the client 104 stores in the server memory 152.

During operation, the client processor 108 and the server processor 148 executed stored program instructions for a predetermined hash function to generate the numeric search term index values for the hash tables 114 and 154 (row index), and the file index values of the hash tables 116 and 154 (column index). In the system 100, the predetermined hash function is typically not a cryptographically secure hash function, because the data being hashed are limited to encrypted search terms and encrypted file identifiers that are already encrypted. Furthermore, an attacker on the server 144 never sees the encrypted search term data because the client 104 does not transmit the encrypted search term data to the server 144. While the attacker on the server 144 can access the encrypted file identifiers and identify the corresponding columns in the tables 116 and 154 for each encrypted file, this information does little to help the attacker identify the contents of the encrypted files or search terms. Consequently, the client 104 and server 144 use any suitable hash function that produces no collisions between different encrypted search terms or encrypted file identifiers using "perfect" hash functions, or employs a hash function with a low probability of collision coupled with secondary hashing or chain hashing to handle collisions. In some embodiments, the client 104 and server 144 use multiple predetermined hash functions or families of hash functions during operation, and the term "predetermined hash function" refers to any suitable combination of hash functions that are used by both the client 104 and the server 144 in addition to using a single predetermined hash function. Of course, a cryptographically secure hash function could be used to generate the index values for the tables 114, 116, and 154, but such a function is not a requirement for the operation of the system 100.

In the embodiment of FIG. 2, the search term hash table 114 ($T_w$) is depicted as column vector with M entries that corresponds to the M rows of the encrypted search table 154. Each entry in the table 114 includes a numeric counter value that is associated with a single search term numeric index. The search term hash table 114 also includes an optional cache of single use cryptographic keys ($_i0, _i1, _i2, \ldots$) that are associated with each search term entry. The single use keys $_im$ are cached for use in updating the encryption of search term entries when the client 104 updates a file and generates an updated encrypted search index for the file. The client 104 changes the single use keys in the table 114 in response to a search operation where the client 104 generates a new single use key. The entries in the search term hash table 114 correspond to rows in the encrypted search table 154 (I). When the client 104 generates a search request for a particular search term, the client 104 uses the counter value in the corresponding entry of the search term hash table 114 along with the index number of the search term and the secret key $K_3$ to generate a first single use encryption key ($\bar{r}_i$) that the server 144 uses to decrypt the corresponding row of encrypted data in the encrypted search table 154. The client 104 then increments the counter value and uses the incremented counter value in the corresponding entry of the search term hash table 114 along with the index number of the search term and the secret key $K_3$ to generate a second single use cryptographic key ($r_i$) that the server 144 uses to re-encrypt the corresponding row of data in the search table 154.

In FIG. 2, the file hash table 116 is depicted as a row vector that includes an entry for each of the N encrypted files stored in the server memory 152. In one embodiment, both the client 104 and the server 144 store copies of the hash table 116, although in other embodiments only the client 104 stores the file hash table and transmits file hash counter information to the server as required or vice-versa. The file hash table 116 is indexed by a numeric hash value of the encrypted file identifier for one of the encrypted files 156. In one embodiment, the encrypted file identifier is an encrypted version of the filename for the file. The client 104 generates the encrypted file identifier using the key $K_2$ to ensure that the server 144 does not have access to the plain text version of the file name.

During operation, the client 104 and server 144 apply the predetermined hash function to the encrypted file name to generate an index number for the file hash table 116. Each entry in the file hash table 116 includes a counter value ($cnt_j$) that is associated with the file at the numeric index j. The client 104 initializes the counter value to a predetermined number (e.g. 0 or 1) when the file is first encrypted, indexed, and stored in the server memory 152. The client increments the counter value in the file counter hash table 116 when the client 104 updates the file and stores an updated version of the file to the server 144. The client uses the file counter value during the encryption process for the search table entries that are stored in the search table 154, and all of the search entries are re-encrypted using a new counter value whenever the file is updated. The client 104 changes the counter value and uses the updated counter value during encryption to ensure that all entries corresponding to different search terms are re-encrypted and have the potential to change during the re-encryption process. Thus, an attacker who monitors the encrypted search table entries for a file cannot identify the particular search terms that have been added or removed from the file during a file update process. In the system 100, the server 144 also uses the counters that are associated with each file during the decryption and re-encryption processing for row data using the selected counter values for the encrypted files 156.

In FIG. 2, the encrypted search table 154 (I) is a two-dimensional table with M rows that each correspond to one search term (indexed by i) and N columns that each correspond to one file (indexed by j) in the N encrypted files 156. Each entry in the table 154, such as entry 228, includes two binary bits of information. The first bit (v) is an encrypted '1' or '0' value that corresponds to whether the search term corresponding to the row i of the entry 228 is included or not included in the file corresponding to the column j of the entry 228. During a search operation, the client transmits a single use cryptographic key to the server 144 that the server 144 uses to decrypt each entry in an entire row of the table 154 on an individual basis to determine if the search term is or is not included in the file. The second bit in the entry 228 is a state bit (st) that is set to 1 when a file update operation potentially changes the contents of the entry 228, such as when a new encrypted file is stored in the server 144 or when the client updates an existing file on the server 144. The state bit is reset to 0 after a search operation accesses the entry and remains 0 until the client performs a subsequent update to the file.

As noted above, in a DSSE process the client generates a plain-text search table δ. In the system 100, the client 104 does not store the plain-text search table δ in the memory 112, and the server 144 never receives the plain-text search table δ. As described in more detail below, in some configurations the client only stores the plain-text search table δ for a plurality of n files in an ephemeral manner prior to encryption and transmission of the encrypted table I to the server 144. In another configuration, the client 104 never constructs a single plain-text table δ for all of the n files. Instead, the client 104 operates on a single file to extract search terms from the file, generate a one dimensional (vector) plain-text search table for the individual file, encrypt the search table, and update a larger two-dimensional encrypted search table on the server 144 with the encrypted search data and the encrypted file. The client 104 optionally performs the same operation on individual files or smaller groups of files to form the encrypted search table 154 and encrypted files archive 156 in an incremental manner.

In some embodiments, the search term hash table 114, file counter hash table 116, and encrypted search table 154 are implemented as sparse tables using techniques for storage and retrieval of data in sparse tables that are known to the art. For example, in some embodiments the search terms are a static set of terms from an existing language, such as English, with a predetermined number of words (e.g. approximately 1 million words in English). The client 104 encrypts the search terms using the key $K_2$ and then uses a predetermined hash function to convert the encrypted search terms to numeric index values in the search term hash table 114. However, in many instances the numeric space of the hash function is much larger than the number of non-trivial entries that populate the hash table. For example, even a comparatively small 32-bit hash space has $2^{32}$ entries, which means that a dictionary of 1 million search terms only fills approximately 1 entry out of every 4,200 entries in the hash space. Consequently, the search term table 114 often includes a large number of trivial (unfilled) entries between entries that correspond to the numeric hashed values of the encrypted search terms. For similar reasons, the file counter hash table 116 and the encrypted search table 154 may be sparse tables. The tables illustrated in FIG. 2 and described herein omit the trivial entries for explanatory purposes.

FIG. 2 depicts the encrypted search table 154 with m rows corresponding to the search terms and n columns corresponding to the encrypted files. A search index identifier i for one of the m rows selects all the encrypted entries that correspond to a single search term. A file index identifier j for one of the n columns selects all the encrypted entries that correspond to a single file. In the embodiment of the system 100, the search index identifier is also referred to as the number i for a row in the table 154 and the file index identifier is also referred to as the number j for a column in the table 154. A particular entry in the encrypted search table 154 (I) is identified with the search index identifier and the file index identifier as I[i, j]. Those of ordinary skill in the art should recognize that a transposed embodiment of the table 154 arranges the search terms along columns and the files along rows, and that the corresponding search index and file index identifiers would correspond to columns and rows, respectively, in a transposed table. More generally, the encrypted entries that identify the presence or absences of a single search term in the encrypted files form one set of data in the table and the encrypted entries for a single file that identify if search terms are present or absent from the file form another set of data in the table.

Figure 3:
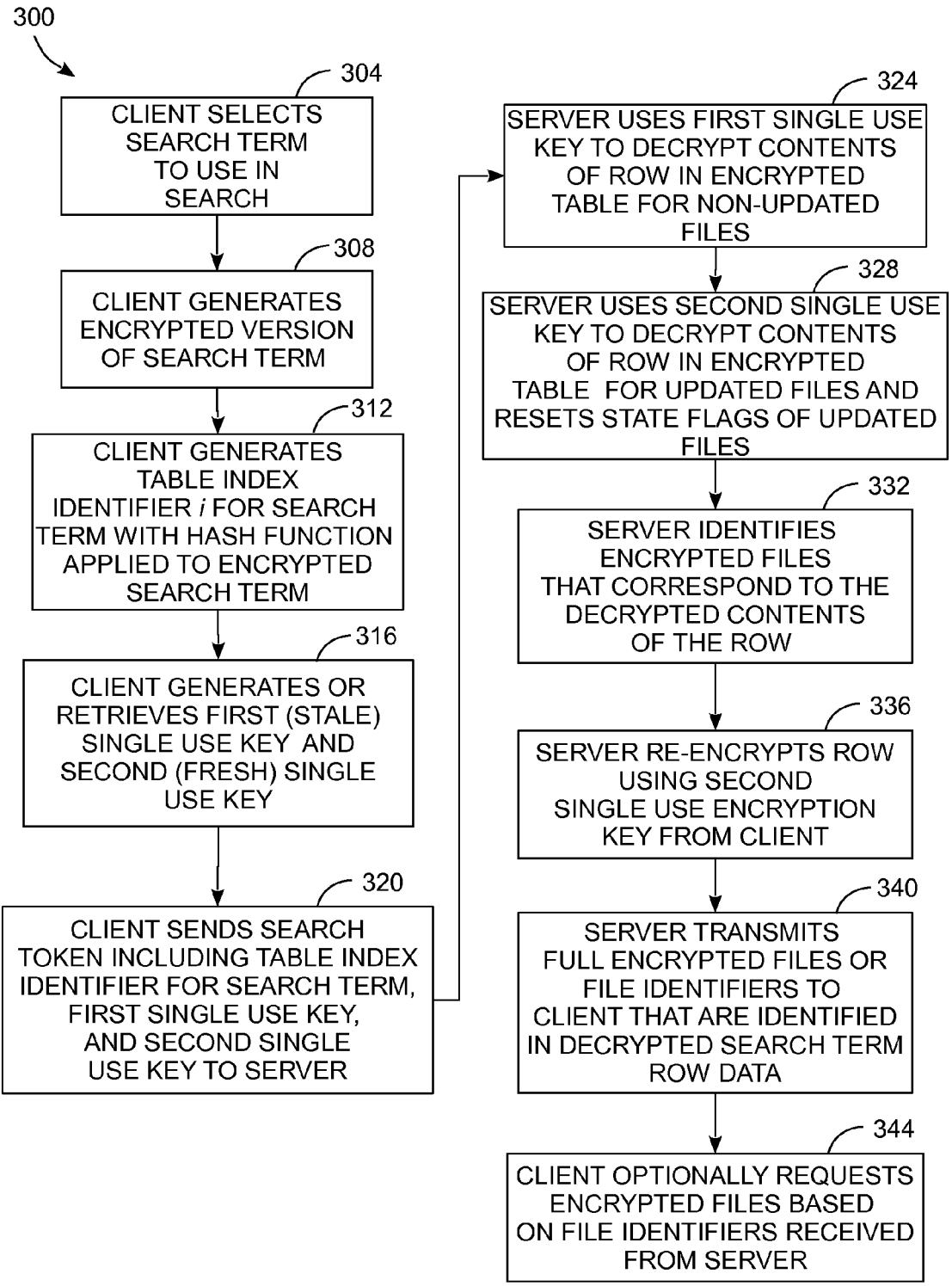
FIG. 3 is a diagram of a process for performing a file search operation operation in the DSSE system of FIG. 1.

FIG. 3 depicts a process 300 for performing a search using the system 100 of FIG. 1. In the discussion below, a reference to the process 300 performing an action or function refers to the operation of a processor to execute stored program instructions to perform the function or action in conjunction with one or more components in the system 100.

In process 300, the client computing device 104 generates a search term query for the server computing device 144. The client 104 selects a search term to use in the query (block 304). In some embodiments, the client processor 108 receives a search term from a user through an input device such as a keyboard, touchscreen interface, speech input device, or other suitable input device. The search term is, for example, a word or other predetermined set of data that corresponds to an entry in the search table 154 that is stored in the server memory 152. In some embodiments, the search terms are contained in a predetermined dictionary that provides a predetermined number of potential search terms. Some of the search terms may not be contained in any of the files that are being searched, which may make storage of the search table 154 somewhat inefficient in comparison to a search table that only includes rows for search terms that are included in at least one file. However, the fixed number of search terms and corresponding fixed number of rows in the search table 154 prevents an attacker from identifying if a file update has added a new search term that was not present in the search table 154 prior to the file update or if a search term has been removed from all of the encrypted files 156. The process 300 is compatible with either a fixed number of search terms or a variable number of search terms in the encrypted search table 154.

Process 300 continues as the client 104 generates an encrypted version of the search term using the encryption key $k_2$ and a predetermined encryption function (block 308). The encryption of the search term $w_i$ is set forth in the following equation: $s_{w_i} \leftarrow Fk_2w$. The client 104 subsequently applies a hash function to the encrypted search term $s_{w_i}$ to generate a numeric row index number i that corresponds to a row in the encrypted search table 154: $i \leftarrow T_w(s_{w_i})$ (block 312). The client 104 also identifies the counter value associated with the search term index i in the search term hash table 114: $\overline{cnt}_i \leftarrow T_w[i].cnt$. The row index number i is a search index identifier for the illustrative embodiment of the system 100 where each row of data in the encrypted search table 154 organizes encrypted entries for a search term into rows.

During process 300, the client 104 generates or retrieves a stale single use key $\bar{r}_i$ and a fresh single use key $r_i$ that correspond to the selected row index i for the encrypted search term $s_{wi}$ (block 316). To generate both the stale and fresh keys, the client 104 retrieves the current counter value $cnt_i$ from the hash table 114 and performs the following key generation functions: $\bar{r}_i \leftarrow G_{k_3}(i\|cnt_i - 1)$ and $r_i \leftarrow G_{k_3}(i\|cnt_i)$. In the embodiment described herein, the hash table 114 stores a counter value for each search term index i that represents the counter used to generate the fresh single use key $r_i$, but in another embodiment the client 104 store the counter value of the stale key $\bar{r}_i$ and increments the counter value $cnt_i$ to generate the fresh key $r_i$. As illustrated in FIG. 2, in some embodiments the client 104 caches previously generated stale and fresh single use keys in the search term counter hash table 114. In these embodiments, the client 104 retrieves the stale single use key $\bar{r}_i$ and the fresh single use key $r_i$ from the table 114.

Process 300 continues as the client 104 sends a search token $\tau_w$ that includes the encrypted search table index i, first single use key $\bar{r}_i$, and second single use key $r_i$ to the server 144 (block 320). In the system 100, the client 104 transmits the search token $\tau_w$ through the network 180 and the server 144 receives the search token $\tau_w$. The client 104 and server 144 establish an encrypted and authenticated communication channel through the network 180 using secure channel techniques that are known to the art prior to the transmission of the search token $\tau_w$. The fresh single use key $r_i$ becomes stale after transmission to the server because the key $r_i$ is now not a secret key known only to the client 104. In some embodiments, the client 104 deletes the previously used stale key $\bar{r}_i$ and the previously fresh single use key $r_i$ becomes the new stale key $\bar{r}_i$ for the search index identifier i. The client 104 increments the counter $cnt_i$ in the search term index hash table ($T_w$) 114 and generates a third fresh single use key $r_i \leftarrow G_{k_3}(i\|cnt_i)$ with the incremented counter prior to or during either another search operation or a file update operation that is described below in FIG. 4. During the next invocation of the process 300, the second single use key is used as the stale key $\bar{r}_i$ and the third single use key is used as the fresh key $r_i$ that the client 104 transmits to the server 144 to decrypt updated entries and to re-encrypt the entries in the row i.

Process 300 continues as the server 144 receives the search token $\tau_w$ and decrypts the encrypted entries corresponding to the search index identifier i using the first single use key $\bar{r}_i$ for entries in the row i that have not been updated (block 324) and decrypts the entries in the row i that have been updated using the second single use key $rb_i$ (block 328). In the system 100, the server 144 uses the state flag bit in each of the encrypted entries of an entire row i (I[i, *].st) to identify entries that have not been updated (state bit is 0) and entries that have been updated (state bit is 1). The non-updated entries correspond to files that have not been changed since the last time the client 104 searched the table 154 at row index i. These files were previously re-encrypted using the stale key $\bar{r}_i$ during a previous instance of the process 300, so the server processor 148 uses the same stale key $\bar{r}_i$ to decrypt the non-updated entries.

The decryption process to generate a plain-text entry I'[j] for a non-updated entry at column j is: $I'[j] \leftarrow I[i, j] \oplus H(\bar{r}_i\|j\|cnt_j)$ where $cnt_j$ is the file counter associated with the encrypted file at index j that is stored in the file counter hash table 116. The updated entries correspond to files that have been changed since the last time the client 104 searched the table 154 at row index i. These files were previously encrypted using the key $r_i$ before the key $r_i$ was transmitted to the server 144, so the key $r_i$ was fresh. The server processor 148 uses the previously fresh key $r_i$ to decrypt the updated entries. The while the server 144 or an attacker could decrypt the non-updated entries in the row i using the stale key $\bar{r}_i$, but the server 144 and the attacker cannot decrypt the updated entries until the client 144 transmits the key $r_i$ to the server 144 during the search process 300. The decryption process to generate a plain-text entry I'[j] for an updated entry at column j is: $I'[j] \leftarrow I[i, j] \oplus H(r_i\|j\|cnt_j)$. The server 144 can perform the decryption described with regards to blocks 324 and 328 in any order or concurrently.

Once the server 144 has generated the decrypted search table data I'[*] for the entire row that is reference by search index i, the server 144 identifies the encrypted files (c) that include the encrypted representation of the search term that corresponds to the index i (block 332). In the embodiment of the system 100, the decrypted plain-text search table entries have a value of 1 if a file at file index identifier j in the search table includes the search term or a 0 if the file does not include the search term. The server 144 uses the same hash function as the client 104 to associate the encrypted file identifiers for each of the encrypted files with the file index identifiers j. In some embodiments, the server 144 caches a reverse lookup information that includes the file identifier, such as a file name of each encrypted file, in the hash table 116 in association with the file index identifier j of each file.

Process 300 continues as the server 144 re-encrypts the decrypted search results and stores the re-encrypted search result data in the encrypted table 154 to replace the previous contents of the row i (block 336). The server processor 148 uses the key $r_i$ to re-encrypt each entry in the row i in conjunction with the file index and file counter for each of the j entries in the row. The server processor 148 uses the random oracle to generate an encryption bit and then performs an exclusive-or operation to re-encrypt the previously decrypted table entry value For example, a re-encrypted element I"[j] is generated from the plain-text bit I'[j] according to the following equation: $I"[j] \leftarrow I'[j] \oplus H(r_i\|j\|cnt_j)$. The server 144 also resets the state bits st of all the entries in the row to 0 during the re-encryption process since each entry in the row i is now encrypted using only the key $r_i$. If the client updates one or more files prior to the next search that is performed on the row i, then the server 144 updates the state bits of the modified entries to 1 to indicate that those entries should be decrypted using a fresh single use key that the client 104 will transmit to the server during a subsequent search operation.

A special case for the processing described above with regards to blocks 316-336 occurs when the client 104 has never performed a search for the search term at index i in the encrypted search table 154 since the initial generation of the encrypted table 154. The client identifies if there have been no previous search operations in response to the counter value in the hash table 114 for search index i being set to a predetermined initial value (e.g. 0 or 1). When no previous search has occurred, the original single use key $r_i$ for row i in the search table 154 is fresh. Any updates that have occurred to row i the table 154 have used only the fresh key $r_i$ for encryption. Consequently, during the first search operation, the client only generates or retrieves the single key $r_i$ and the server 144 decrypts all entries in the row i using only the single use key $r_i$. The server 144 subsequently re-encrypts using the same key $r_i$. After the server 144 receives the single use key $r_i$, the single use key $r_i$ is now stale($\bar{r}_i \leftarrow r_i$), and the client 104 increments the appropriate counter in the client counter hash table 114 ($\overline{cnt_i} \leftarrow cnt_i+1$) prior to generating a fresh key for the row using the updated counter value: $r_i \leftarrow G_{k_3}(i\|cnt_i)$.

As described above, during the process 300 the server 144 performs decryption and re-encryption of entries in a row i of the search table 154 on an individual basis. That is to say, the server process 148 decrypts each entry along the row i using the stale key $\bar{r}_i$, entry column index j and file counter value $cnt_j$ independently from the other entries in the row. Similarly, the server processor 148 re-encrypts each row entry using the previously fresh key $r_i$, entry column index j and file counter value $cnt_j$ independently from the other entries in the row. The server processor 148 optionally uses parallel hardware processing units to perform multiple decryption and re-encryption operations concurrently to increase the speed of the search operation in process 300. The server processor 148 deletes the second single use key $r_i$ from the memory 152 shortly after the re-encryption process to reduce the likelihood that an attacker can retrieve the single use key $r_i$ from the memory 152 to decrypt the row i. During a subsequent search operation for the row i, the server 144 receives $r_i$ again as the stale key (relabeled $\bar{r}_i$) that is used for decryption in the subsequent search operation.

During process 300, the server 144 transmits either the full contents and file identifiers or only the file identifiers of the encrypted files (c) 156 that the server 144 has identified from the decrypted search table data 154 to the client (block 340). When the server 144 transmits the full contents of the files, the client 104 decrypts the encrypted file contents using the secret symmetric key $k_1$ and decrypts the file identifiers using the secret symmetric key $k_2$. In an embodiment where the client 104 only receives the file identifier information in the initial search, the client 104 optionally requests one or more of the encrypted files and the server 144 transmits the requested encrypted files to the client 104 for further decryption and processing (block 344).

During operation of the system 100, the search operation of process 300 reveals or "leaks" some information about the encrypted search table 154 and the encrypted files 156 to potential attackers. An attacker that has the ability to monitor the activities of the server during process 300 can learn the decrypted values of the entries in a single row i of the table 154 when the client searches for the key word that is associated with the search index i. Once again, the attacker does not learn the actual plain-text contents of the search term and does not learn the plain-text contents of any of the encrypted files c. However, the attacker does learn that a particular set of encrypted files includes a search term that corresponds to the search index identifier i. Consequently, the re-encryption process does not prevent the attacker from identifying the plain-text contents of the row i after the plain-text information has leaked. However, the re-encryption process is still useful to prevent transient attackers who only gain access to the server 144 after process 300 is performed. Additionally, as described below in FIG. 4, when the client performs a file update, the new search table entries for the file are re-encrypted using only fresh keys stored in the client. Consequently, even if an attacker learns the content of a row in the search table 154 during a search operation, the attacker is unable to identify updated row entries that occur when the client updates one or more files before the next search operation.

The embodiment of the system 100 and the process 300 described above describes individually encrypted entries in the encrypted search table 154. During a row decryption process, the server 144 decrypts and re-encrypts each row entry individually using the first single-use key $\bar{r}_i$ and the second single-use key $r_i$. In an alternative embodiment, the server 144 performs the row decryption and re-encryption process using a block-cipher where the server processor 148 decrypts and encrypts multi-bit blocks of each row in a single operation. As used herein, the term "block" when used in regards to encrypted or decrypted data refers to a contiguous set of bits stored in the client memory or server memory that are encrypted or decrypted together using a single cryptographic key in a block cipher encryption scheme. For example, using the AES block cipher in a counter mode encryption scheme, the processor 148 decrypts and re-encrypts blocks of 128 entries or 256 entries at a time instead of decrypting and re-encrypting individual single-bit entries. A block cipher counter mode encryption/decryption scheme refers to a process where the cryptographic key encrypts and decrypts a numeric counter value that is used only once to encrypt a single set of plaintext data. Thus, the cryptographic key is actually never used to encrypt the plaintext data directly, only the counter number. To encrypt the plaintext data, the client or server processor performs an XOR operation between the encrypted counter value and the plaintext data to generate an encrypted result. The encrypted data corresponding to the counter remain private to maintain the secrecy of the plaintext data from attackers who have access to the encrypted ciphertext. To decrypt the encrypted data, the client or server processor regenerates the encrypted version of the counter number using the same cryptographic key/counter value combination and performs another XOR operation on the ciphertext to regenerate the plaintext. One advantage of counter mode encryption is that parallel processing hardware can perform multiple encryption and decryption operations in parallel using different counter numbers for different blocks of data. Additionally, many processor embodiments implement instructions or functional units that enable efficient encryption and decryption operations using block ciphers that increase the performance of block encryption and decryption of multiple row entries compared to encryption and decryption of individual row entries. The general counter mode encryption scheme described above and variations thereof is known to the art.

Figure 5:
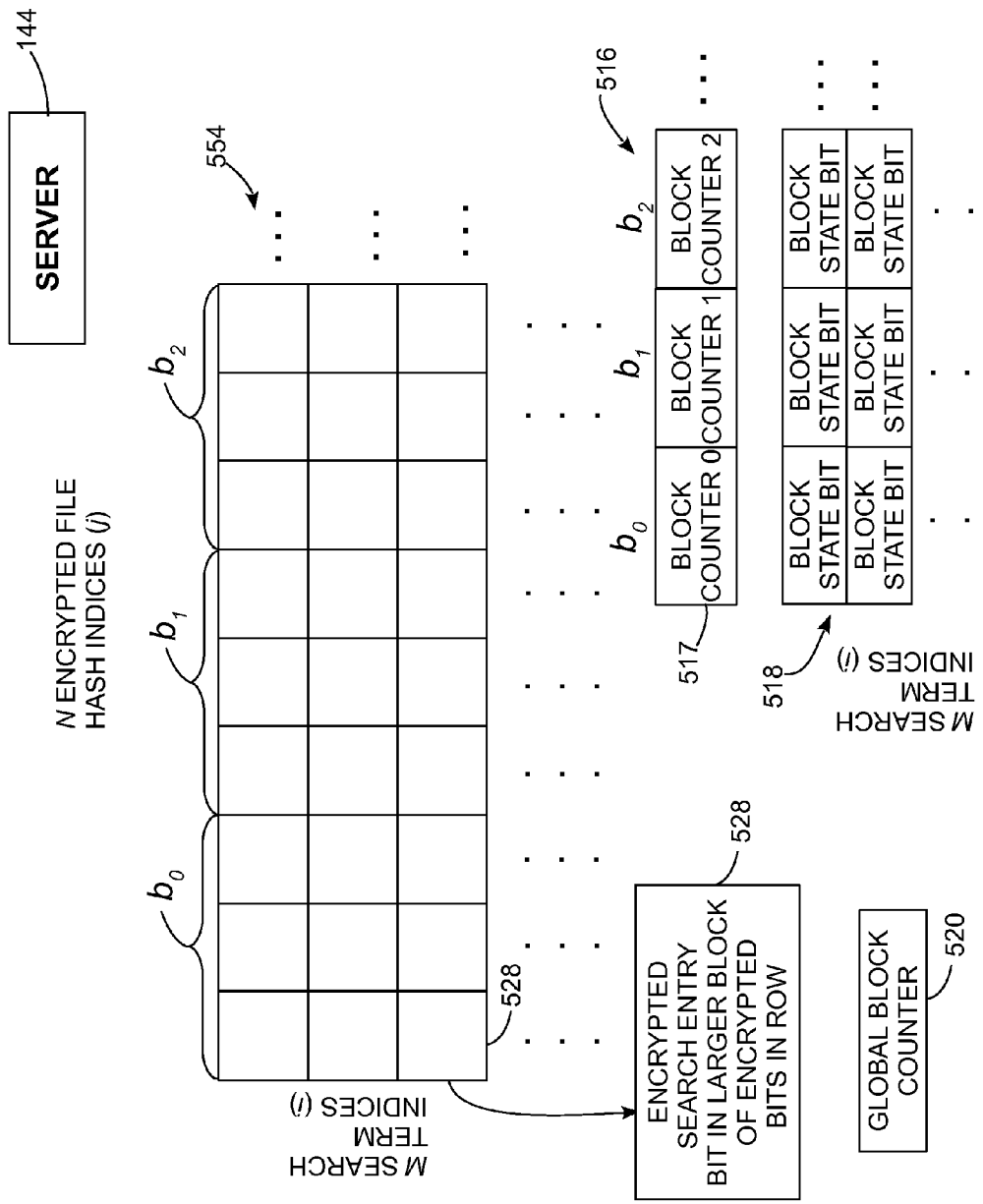
FIG. 5 is a diagram of search tables and indices that are used for implementing the DSSE processes in the system of FIG. 1 using block cipher encryption and decryption.

FIG. 5 depicts a modified version of the encrypted table 554 and a modified file index hash table 516. As depicted in FIG. 5, the table 554 is organized into blocks $b_0$, $b_1$, $b_2$, etc. that include a number of entries corresponding to the size of a block cipher key that decrypts and re-encrypts each block of data in a row of the table 554. FIG. 5 depicts blocks with three entries each for illustrative purposes, but practical embodiments typically use blocks that each include 128 entries, 256 entries, or some other number of entries that correspond to the key size of a suitable block cipher. The encrypted table 554 has the same structure as the encrypted table 154 that is describe above, but each of the entries in the table 554 only include the encrypted single-bit entry corresponding to the presence or absence of a search term at index i in an encrypted file at index b. The entry 528 is an example of one entry in the table 554. The file state bit is not present in each entry of the table 554 because the updated or non-updated state bit flag now applies to an entire block (e.g. $b_0$, $b_1$, $b_2$ . . . ) in the table 554.

In FIG. 5 the file counter hash table 516 now includes counter entries that correspond to an entire block of entries in the table 554 instead of to the individual column numbers for individual files. For example, the file counter hash table entry $b_0$ include a stored counter value 517 that corresponds to all of the entries in the block $b_0$ in the table 554. When the server processor 144 first generates the table 554, each of the block counter values is assigned a default unique number (e.g. 1, 2, 3, 4, . . . B−1 for B blocks). The server memory 152 also stores a "global" counter value 520 (gc) that holds the highest counter value for any of the entries in the table 516 (e.g. gc=B−1 after initialization of the table 554). The counter values in the table 516 are unique for each block because, as described in more detail below, the counter values are used in counter mode encryption and decryption operations for a full block of data during the process 300. As is known in the art, counter mode encryption relies on using a unique counter value to encrypt only one set of data using a single key and never using the same counter value to encrypt a different set of data with the same key. The server processor 148 updates the block counter value for any of the entries in the table 516 whenever any of the files in a block $b_n$ receives an update. The update process is which is described in more detail below in the process 400. To perform the update, the server processor 148 increments the global block counter 520 (e.g. gc'=gc+1) and assigns the newly incremented global block counter value to the corresponding entry in the table 516. For example, the server processor 148 updates the block counter 0 in block $b_0$ to the new global counter value gc' when the server 144 performs an update operation for one of the files in block $b_0$ of the encrypted search table 544. During operation, the server 144 continues to increment the global counter 520 and update the counter values for different entries in the table 516 in response to update operations that occur for the files corresponding to the blocks in the encrypted search table 554. Thus, each counter value entry in the table 516 is used by a single key, such as each of the row keys $r_i$, to encrypt and decrypt only a single block of data in each row.

In the embodiment of FIG. 5, the server memory 152 includes a table 518 that stores block-level state bit data that corresponds to the rows i in the encrypted search table 554. The table 518 stores a single state bit $st_b$ for each of the M rows and B blocks of data in the encrypted search table 554. Each state bit entry $st_b$ operates in a similar manner to the state bits entries described above in the embodiment of FIG. 2 and the process 300, but each state bit covers a block of entries in a row. That is to say, if the state bit $st_b$ is 0 then none of the files in a particular block have been updated since a previous search operation and the server processor 148 uses the stale key to perform the block-level decryption. If, however, the state bit $st_b$ is 1, then the block of encrypted row data has been updated since the last search operation, and the server processor 148 uses the previously fresh key $r_i$ to perform the decryption. The server processor 148 then resets the corresponding block state bit in the table 518 to 0 after re-encrypting the block using the key $r_i$. The client 104 transmits the counter values to the server 144 as part of a search request during the process 300.

During operation with the block cipher embodiment of FIG. 5, the client computing device 104 generates the single use keys $r_i$ using a symmetric key generation process that is suitable for generating symmetric keys for use with the counter mode block cipher scheme. For example, in one embodiment the client processor 108 generates the single use keys as 128 bit or 256 bit keys that are suitable for use with the AES cipher. The key generation process produces keys in an unpredictable manner to prevent an attacker from using a history of previously seen stale keys $\bar{r}_i$ to predict the contents of additional fresh keys that the client 104 generates during operation.

The client 104 and server 144 perform the process 300 using the block encryption/decryption embodiment of FIG. 5 in a similar manner to the single-bit entry embodiment described above. In particular, the server 144 receives both fresh and stale block cipher keys $r_i$ and $\bar{r}_i$ respectively, for a particular row i as part of a search request. The server processor 148 uses a block decryption process to decrypt the different blocks in the row i using the corresponding counter values that are stored in the block index table 516. In an alternative embodiment, the client 104 stores the counter values and transmits the counter values as part of the search request. During the process 300, the server processor 148 references the state bit entries in the table 518 for the row i to identify blocks that correspond to updated files ($st_b$=1) and blocks that correspond to entries where no files have been updated ($st_b$=0). The server processor 148 uses the previously fresh key $r_i$ to decrypt the blocks that include the updated files and the stale key $\bar{r}_i$ to decrypt the blocks where no files have been updated. The server processor 148 re-encrypts the entire row on a block-by-block basis using the previously fresh key $r_i$ and the corresponding block counter values stored in the table 516.

Figure 4:
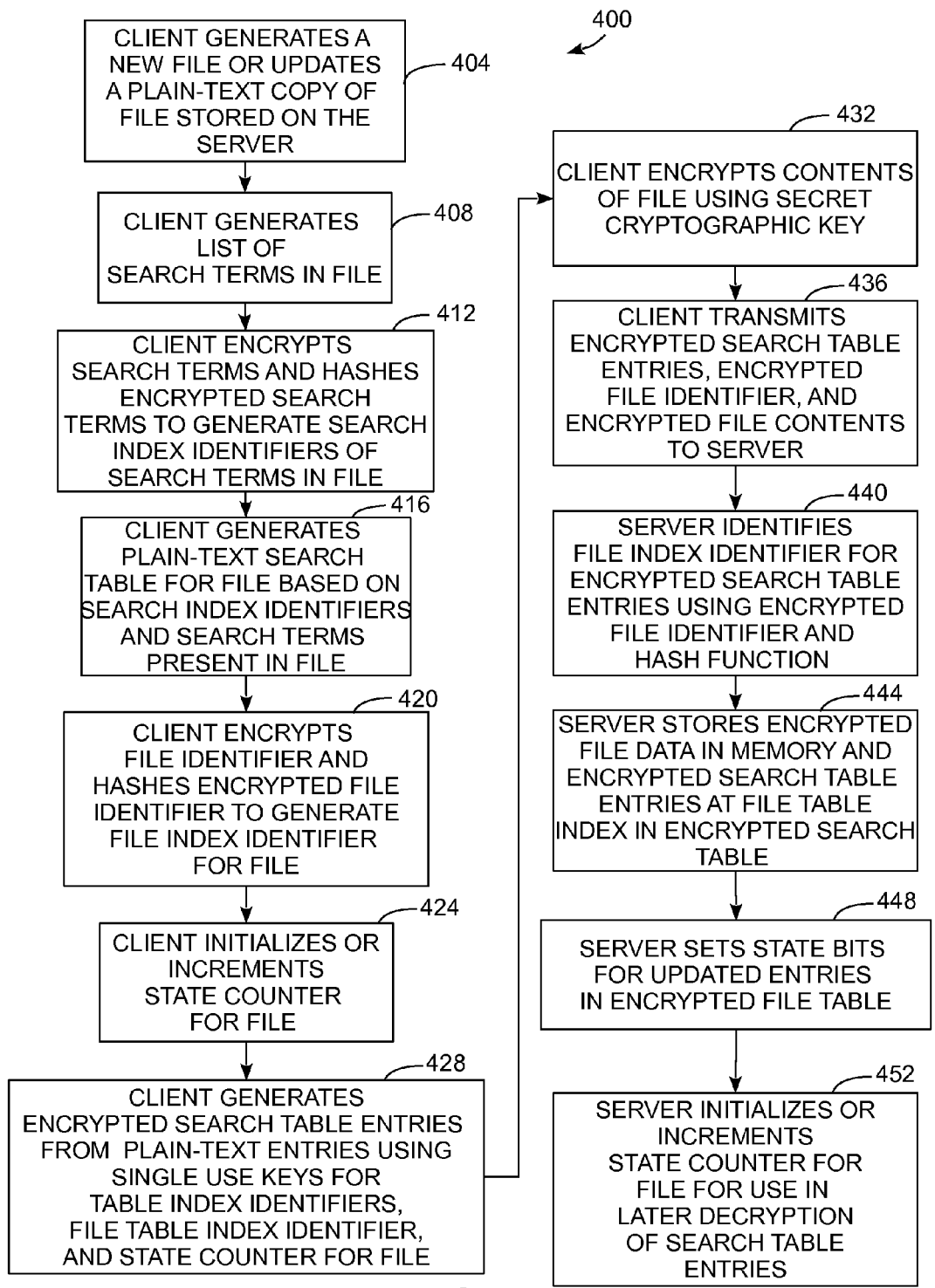
FIG. 4 is a diagram of a process for performing a file update operation in the DSSE system of FIG. 1.

In addition to performing search operations, the client 104 can store an encrypted file in the server 144 and update the encrypted search table 154. FIG. 4 depicts a process 400 for file modification to either add a new file or update a previously generated encrypted file in the system 100 of FIG. 1. In a file update operation, the client 104 retrieves and decrypts an encrypted file from the server 144, modifies the file, encrypts the modified file, and transmits the encrypted modified file and an updated set of encrypted search table data to the server 144. During the file update the client 104 may add new search terms to the file, delete all references to one or more search terms in the file, or potentially make changes that neither add new search terms nor completely remove any search terms in the file. In a file addition operation, the client 104 transmits a new encrypted file and set of search table data to the server 144. The client 104 can also delete files from the server 144, but a deletion operation only involves deleting the encrypted data file and the corresponding column of encrypted data from the search table 154, and is not described in further detail herein. In the discussion below, a reference to the process 400 performing an action or function refers to the operation of a processor to execute stored program instructions to perform the function or action in conjunction with one or more components in the system 100.

During process 400, the client computing device 104 generates a new file or updates a plain-text copy of a file that is stored in an encrypted form on the server computing device 144 (block 404). In FIG. 1, the plain-text file data 120 in the client computing device memory 112 depicts an example of a plain-text file. The client computing device processor 108 executes a program to generate or update the plain-text file 120. In some instances, a user of the client 104 provides input using one or more input devices to modify the contents of the plain-text file 120. As described above, the update process optionally includes adding one or more search terms to the plain-text file 120, deleting all instances of one or more search terms from the plain-text file 120, a combination of addition or deletion, and potentially updates that change the contents of the file 120 but do not add or remove any search terms.

Process 400 continues as the client 104 generates a list of search terms in the file after generating the new file or updating an existing file (block 408). In the system 100, the client processor 108 executes a text extraction program that performs parsing, tokenization, word-stemming, and other text processing techniques that are known to the art to generate the list of search terms that are present in the plain text file 120.

Some embodiments of the client processor 108 that incorporate parallel hardware to perform the search term extraction and identification process.

As described above, in some embodiments the system 100 operates with a fixed set of search terms (e.g. words in the English language or other language). The search term extraction process optionally includes identifying search terms present in file metadata, including search terms that are present in the plain-text file name for the file. The client does not includes non-standard terms in the file 120 or other data such as numbers in the generated list of search terms in this embodiment. In another embodiment, the system 100 expands the encrypted search table 154 when a new or updated file includes a new search term that has not been included in other encrypted files in the system 100. Expanding the encrypted search table 154 for new search terms enables more flexible searching, but an attacker can identify when a new search term is added and identify that the new search term is included in only one new file when the search term is initially added to the table 154. Process 400 can be used in conjunction with search table embodiments that are either fixed-size or that can expand to add new search terms.

Process 400 continues as the client encrypts the list of search terms in the file and hashes the encrypted key words to generate search index identifiers of the search terms in the file (block 412). For example, for a search term w the client 104 uses the secret symmetric key $k_2$ to generate an encrypted search term $s_w$. The client 104 then applies the hash function to the encrypted search term $s_w$ to generate the numeric search index identifier i that corresponds to the row i in the encrypted search table 154 in the server memory 152. The encryption function to generate the encrypted search term $s_w$ ensures that an attacker on the server 144 cannot identify the search term that corresponds to index i by simply applying the hash function, which is not a secret, to plain-text search terms. Thus, search term index identifiers in the encrypted table 154 are tied to the secret encryption key $k_2$, and two different client computing devices that use different keys generate different sets of search index identifiers for the same search terms. Some embodiments of the client processor 108 that incorporate parallel hardware to perform the encryption and hashing processes for multiple individual search terms in parallel to reduce the time required to complete the update process 400.

During process 400, the client 104 generates a plain-text search table δ for the file based on the search index identifiers that are generated for the search terms in the file (block 416). The search table δ has a similar structure to the encrypted search table (I) 154 that is stored in the server memory 152, but the search table δ for a single file only includes a single linear arrangement of entries (e.g. a single column), and the contents of the entries in the search table δ are not encrypted. The client 104 assigns each entry in the search table δ that corresponds to one of the identified search term index numbers i a value of 1 to indicate that the file contains the search term and assigns a value of 0 to the remaining entries in the table δ.

Process 400 continues as the client 104 encrypts the file identifier that is associated with the file and hashes the encrypted file identifier to generate the numeric file index identifier for the file (block 420). In the system 100, the client 104 uses the key $k_2$ to encrypt the plain-text file identifier, which is typically the filename used to address the file in filesystems that are well-known to the art. The client 104 then applies the predetermined hash function to the encrypted file identifier to generate the numeric file index identifier j for the file. The generation process of the file index identifier j is similar to the generation process of the search index identifiers i, but the file index identifier j is used to address the encrypted search entries for the file in a column j of the encrypted search table 154 instead of selecting entries for a particular search term in a row i of the encrypted search table 154.

Process 400 continues as the 104 client initializes or increments the state counter $cnt_j$ that is associated with the file (block 424). If the file is a new file, the client 104 initializes the counter to a predetermined value (e.g. 0 or 1) and adds a new entry for $cnt_j$ to the file counter hash table 116 at index j. For an update to an existing files, the client 104 increments the state counter $cnt_j$ for the file at index j in the file index hash table 116. As described below, the incremented counter value is used during the encryption of the entries in the plain-text search table δ. The incremented counter value ensures that each entry in the search table δ is encrypted using a potentially different output from the random oracle during each file update operation. Consequently, even if an entry in the plain-text search table δ does not change during a file update process, the value of the entry in the updated encrypted search table might change (with a 50% probability) from the encrypted entry in a previous version of the encrypted search table. Thus, an attacker that has access to an earlier version of the encrypted search index j for the file and the updated version of the search index cannot identify which search terms were added or removed from the file because any of the entries in the updated encrypted file index may change in an unpredictable manner.

The client 104 uses the file index identifier, file state counter, and a plurality of the fresh single use encryption keys $r_i$ corresponding to each of the i file index identifiers to encrypt the plain-text search table δ and generate an encrypted search table $I_j$ for the file j (block 428). For example, to encrypt a single entry δ[i], the client applies the random oracle function H to a combination of the fresh row key $r_i$, file index identifier j, and the counter $cnt_j$. The client 104 then performs an exclusive-or operation with the plain-text file entry and the output of the random oracle to generate the encrypted search index entry $I_j[i]$. The encryption operation for a single entry $I_j[i]$ is also defined with the following mathematical operation: $I_j[i] \leftarrow \delta[i] \oplus H(r_i\|j\|cnt_j)$. The client repeats the encryption process for each of the i search index entries.

As described above, the client 104 generates single use cryptographic keys for each search index identifier i, and optionally caches the single use keys in the search index hash table 114. During process 400, the client 104 uses only the fresh cryptographic key corresponding to the table entry at search index i to encrypt each entry in the encrypted search table $I_j$. If necessary, the client 104 increments the search index counter in the hash table 114 and performs the single use key generation process using the key $k_3$ to generate a fresh single use key if one is required. The client 104 generates the encrypted search table $I_j$ with a similar structure as a single column j in the encrypted table 154, although in some embodiments the client 104 omits the state bit field st since the server 144 can set the state bit fields. Some embodiments of the client processor 108 that incorporate parallel hardware perform the encryption of the individual search table entries with the corresponding single use keys in parallel to reduce the time required to complete the update operation 400.

During the process 400, the client 104 encrypts the contents of the plain text file (block 432). In the system 100, the client 104 uses the secret symmetric key $k_1$ to encrypt the plain text file data 120 to generate an encrypted file c. The client 104 uses, for example, a block cipher encryption scheme such as AES or another suitable symmetric encryption scheme to generate the encrypted file c. The encryption of the file data optionally occurs before, after, or concurrently with the generation of the encrypted search table $I_j$ for the file as described above with reference to blocks 408-428 in the process 400.

Process 400 continues as the client 104 transmits the encrypted search table entries $I_j$, the encrypted file identifier, and the encrypted contents of the file c to the server 144 (block 436). In the system 100 the client 104 and server 144 establish an authenticated and optionally encrypted channel through the network 180 prior to the transmission. In the embodiment of FIG. 4, the server 144 applies the predetermine hash function to the encrypted file identifier to identify the numeric file index identifier j (block 440), and stores the encrypted search table data $I_j$ in the encrypted search table 154 at the column index j (block 444). In an update operation to an existing encrypted file c that is stored in the server memory 152, the server 144 replaces the entries for an entire column j in the table 154 with the updated encrypted entries from the client 104. For a new file, the server 144 allocates space for an additional column in the memory 152 and adds the new column to the encrypted search table 154. The server 144 also sets the state bits for each entry in the column j to 1 (I[*, j].st=1), which indicates that the entries have been updated and that the server 144 should use the corresponding fresh row key $r_i$ to decrypt the updated entries during a subsequent search operation (block 448). The server 144 also initializes or increments the state counter $cnt_j$ for the file in the file counter hash table 116 to maintain a consistent counter state with he client 104 (block 452). As described above in the process 300, the server 144 uses the state counters for the files to decrypt the search table entry for the entry I[i, j] during a subsequent search operation for the search term that is associated with row i.

The process 400 can also be performed using the block cipher embodiment that is discussed above in FIG. 5 as modified below. In the block-cipher embodiment, the client generates fresh single use keys $r_i$ as needed using a suitable key generation process for the block cipher, such as a 128-bit or 256-bit key generation process that is compatible with the AES block cipher scheme or other suitable block cipher scheme. During the process 400, the client 104 generates an entire encrypted block of data to update each row of the encrypted search table instead of encrypting a single entry in each row. Using the embodiment of FIG. 5 as an illustrative example, if the client is updating a file with a file index entry in the block $b_1$ in the table 554, then the client 104 receives the encrypted contents of the entire block $b_1$ from all the rows i in the encrypted table 554. The server 144 transmits the encrypted search table data including the blocks corresponding to the file for a row or multiple rows in the table 554 to the client 104 prior to the encryption process described in the processing of block 428. The client 104 has access to the stale or fresh single use keys that encrypted the row data, and the client decrypts the encrypted blocks of data from the server 144.

During the search term encryption of the process 400 using the block encryption embodiment of FIG. 5, the client 144 uses the fresh single use keys for each row to re-encrypt the entire block of data including the entry in the updated file. The client 104 uses the updated global counter value 520 (e.g. gc'=gc+1) to encrypt each block of data using counter mode encryption with a new counter that has not been previously used to encrypt data in the encrypted search table 154. In one embodiment the server 144 transmits the updated global counter value to the client, while in another embodiment the client 144 maintains a copy of the global counter. The client 144 transmits the newly encrypted block in each row i of the encrypted search table to the server 144, and the server 144 updates the search table 554 with the newly encrypted data blocks. The server 144 updates the state bits in the block hash table 518 to indicate that all of the row entries for the rows in the block ($b_1$) have been updated to enable the server 144 to decrypt the entries during a subsequent search operation. The server 144 also updates the block counter table 517 with the updated global counter value that applies to all of the encrypted search table entries in the updated block.

The embodiments described above in FIG. 1-FIG. 5 provide a CKA-2 secure DSSE system that includes security and performance properties that are not present in existing DSSE schemes. In particular, the embodiments described above do not leak the size pattern information about the total number of search term to file associations that are stored in the encrypted search tables. While a persistent attacker can observe the number of entries associated with different search term index values when the client 104 performs the search operation in process 300, the attacker cannot identify the total number of search term entry to file relationships for the entire encrypted search table. Additionally, the embodiments described above enable efficient parallel processing by both the client and server computing devices during encryption and decryption of search table entries.

Additional definitions of terms used herein and a mathematical proof of the CKA-2 properties of the system and methods described above are set forth below.

Operators || and |x| denote the concatenation operation and the bit length of variable x, respectively. $x \xleftarrow{\$} S$ denotes that variable x is randomly and uniformly selected from set S. For any integer l, $(x_0, \ldots, x_l) \xleftarrow{\$} S$ means $(x_0 \xleftarrow{\$} S, \ldots, x_l \xleftarrow{\$} S)$. |S| denotes the cardinality of set S. $\{x_i\}_{i=0}^{l}$ denotes $(x_0, \ldots, x_l)$. The term $\{0, 1\}^*$ denotes the set of binary strings of any finite length. $\lfloor x \rfloor$ denotes the floor value of x and $\lceil x \rceil$ denotes the ceiling value of x. $\langle q_1, \ldots, q_n \rangle$ denotes set of items $q_i$ for i=1, . . . , n. Given a bit a, $\bar{a}$ means the complement of a. Variable κ is an integer and it is used to denote the security parameter. log x means $\log_2 x$.

$\mathcal{E}$ =(Gen, Enc, Dec) is IND-CPA secure symmetric key encryption scheme, which includes a secret key generation process, an encryption process, and a decryption process. $k_1 \mathcal{E} . Gen(1^κ)$ is a Probabilistic Polynomial Time (PPT) key generation process that accepts a security parameter κ and returns a secret key c←$\mathcal{E}$.$Enc_{k_1}$(M) is the encryption process accepts the secret key $k_1$ and a message M, and returns a ciphertext c. M←$\mathcal{E}$.$Dec_{k_1}$(c) is the decryption process that accepts $k_1$ and c, and returns M if $k_1$ was the key under which c was produced.

A Pseudo Random Function (PRF) is a polynomial-time computable function, which is indistinguishable from a true random function by any PPT attacker. F:$\{0, 1\}^κ \times \{0, 1\}^* \rightarrow \{0, 1\}^κ$ is a keyed PRF denoted as τ←$F_{k_2}$(x), which takes a secret key $k_2 \xleftarrow{\$} \{0, 1\}^κ$ and an input x, and returns a token τ. G:$\{0, 1\}^κ \times \{0, 1\}^* \rightarrow \{0, 1\}^κ$ is a keyed PRF denoted as r←$G_{k_3}$(x), which takes a secret key $k_3 \leftarrow \{0, 1\}^κ$ and an input x and returns a key r.

H:$\{0, 1\}^{|x|} \leftarrow \{0, 1\}$ is a Random Oracle (RO), which takes an input x and returns a bit as output.

$f_{id}$ and w denote a file with unique identifier id and a unique (key)word that exists in a file, respectively. A search term w is of length polynomial in κ, and a file $f_{id}$ may contain any such search term (i.e., the search term universe is not fixed). For practical purposes, n and m, denote the maximum number of files and search terms to be processed by application, respectively. $f=(f_{id_1}, \ldots, f_{id_n})$ and $c=c_{id_1}, \ldots, c_{id_n}$ denote a collection of files (with unique identifiers $id_1, \ldots, id_n$) and their corresponding ciphertext computed under $k_1$ via Enc, respectively.

Index (also called database in the literature) $\delta$ is a n×n matrix, where $\delta[i, j] \in \{0, 1\}$ for $i=1, \ldots, m$ and $j=1, \ldots, n$. Initially, all elements of $\delta$ are set to 0. Given a matrix $\delta$, $\delta[*, j]$ and $\delta[i, *]$ mean accessing all elements in j'th column and i'th row, respectively. $\delta[i, *]^T$ denotes the transpose of i'th row of $\delta$. I is a n×n matrix, where $I[i, j] \in \{0, 1\}^2$. $I[i, j].v$ stores $\delta[i, j]$ in encrypted form depending on state and counter information. $I[i, j].st$ stores a bit indicating the state of $I[i, j].v$. Initially, all elements of I are set to 0. $I[i, j].st$ is set to 1 whenever its corresponding $f_j$ is updated, and it is set to 0 whenever its corresponding search term $w_i$ is searched. The term $I[i, j]$ without any additional elements denotes $I[i, j].v$ for brevity, and the state bit $I[i, j].st$ is referenced expressly. The encrypted index is denoted by $\gamma$ and the encrypted matrix corresponds to the encrypted matrix I and a hash table.

Each file $f_{id}$ and search term w pair are mapped to a unique set of indices (i, j) in matrices ($\delta$, I). Static hash tables uniquely associate each file and search term to its corresponding row and column index, respectively. Static hash tables also enable to access the index information in (average) O(1) time. $T_f$ is a static hash table whose key-value pair is $\{s_{f_j}, \langle j, cnt_j \rangle\}$, where $s_{f_j} \leftarrow F_{k_2}(id_j)$ for file identifier $id_j$ corresponding to file $f_{id_j}$ of F for a file identifier $id_j$ of file $f_{id_j}$, index $j \in \{1, \ldots, n\}$ and cnt is a counter value. The terms $j \leftarrow T_f(s_{f_j})$ and $cnt_j \leftarrow T_f[j].cnt$ denote access operations. $T_w$ is a static hash table whose key-value pair is $\{s_{w_i}, \langle i, \overline{cnt}_i \rangle\}$, where token $s_{w_i} \leftarrow F_{k_2}(w_i)$, index $i \in \{1, \ldots, n\}$ and $\overline{cnt}$ is a counter value. $i \in \{1, \ldots, n\}$ and $\overline{cnt}$ is a counter value. The terms $i \leftarrow T_w(s_{w_i})$ and $\overline{cnt}_i \leftarrow T_w[i].cnt$ also denote access operations. All counter values are initially set to 1.

The embodiments presented above are shown to be secure according to the following theorem:

Theorem 1

If Enc is IND-CPA secure, (F, G) are PRFs and H is a RO then the DSSE scheme is ($\mathcal{L}_1$, $\mathcal{L}_2$)-secure in ROM to implement CKA-2 security.

Proof:

A simulator S interacts with an attacker A in an execution of an Ideal$_{A,S}(\kappa)$ experiment.

In this experiment, S maintains lists $\mathcal{L}$ R, $\mathcal{L}$ K and $\mathcal{L}$ H to keep track the query results, states and history information, initially all lists empty. $\mathcal{L}$ R is a list of key-value pairs and is used to keep track RO(.) queries. We denote value$\leftarrow \mathcal{L}$ R(key) and $\perp \leftarrow \mathcal{L}$ R(key) if key does not exist in $\mathcal{L}$ R. $\mathcal{L}$ K is used to keep track random values generated during the simulation and it follows the same notation that of $\mathcal{L}$ R. $\mathcal{L}$ H is used to keep track search and update queries, S's replies to those queries and their leakage output from ($\mathcal{L}_1$, $\mathcal{L}_2$).

S executes the simulation as follows:

I. Handle RO(.) Queries:

Function $b \leftarrow RO(x)$ takes an input x and returns a bit b as output. Given input x, if $\perp = \mathcal{L}$ R(x) then set $b \xleftarrow{\$} \{0, 1\}$, insert (x, b) into $\mathcal{L}$ R and return b as the output. Else, return $b \leftarrow \mathcal{L}$ R(x) as the output.

II. Simulate ($\gamma$, c):

Given $(m, n, \langle id_1, \ldots, id_{n'} \rangle, \langle |c_{id_1}|, \ldots, |c_{id_{n'}}| \rangle) \leftarrow \mathcal{L}_1(\delta, f)$, S simulates ($\gamma$, c) as follows:

1. $s_{f_j} \xleftarrow{\$} \{0, 1\}^\kappa$, $y_j \leftarrow T_f(s_{f_j})$ and insert $(id_j, s_{f_j}, y_j)$ into $\mathcal{L}$ H, for $j=1, \ldots, n'$.

2. $c_{y_j} \leftarrow \mathcal{E}.Enc_k(\{0\}^{|c_{id_j}|})$, where $k \xleftarrow{\$} \{0, 1\}^\kappa$ for $j=1, \ldots, n'$.

3. For $j=1, \ldots, n$ and $i=1, \ldots, m$
    a) $T_w[i].st \leftarrow 1$ and $T_f[j].st \leftarrow 1$.
    b) $z_{i,j} \xleftarrow{\$} \{0, 1\}^{2\kappa}$, $I[i, j] \leftarrow RO(z_{i,j})$ and $I[i, j].st \leftarrow 0$.

4. Output ($\gamma$, c), where $\gamma \leftarrow (I, T_f)$ and $c\{\langle c_1, y_1 \rangle, \ldots, \langle c_{n'}, y_{n'} \rangle\}$.

Correctness and Indistinguishability:

c has the correct size and distribution, since $\mathcal{L}_1$ leaks $\langle |c_{id_1}|, \ldots, |c_{id_{n'}}| \rangle$ and Enc is a IND-CPA secure scheme, respectively. I and $T_f$ have the correct size since $\mathcal{L}_1$ leaks (m, n). Each $I[i, j]$ for $j=1, \ldots, n$ and $i=1, \ldots, m$ has random uniform distribution as required, since RO(.) is invoked with a separate random number $z_{i,j}$. $T_f$ has the correct distribution, since each $S_{f_j}$ has random uniform distribution, for $j=1, \ldots, n'$. Hence, A does not abort due to A's simulation of ($\gamma$, c). The probability that A queries RO(.) on any $z_{i,j}$ before S provides I to A is negligible $$\left(\text{i.e., } \frac{1}{2^{2\kappa}}\right).$$

Hence, S also does not abort.

Simulation: Assume that S receives a search query w on time t. S is given $(P(\delta, Query, t), \Delta(\delta, f, w_i, t)) \leftarrow \mathcal{L}_2(\delta, f, w, t)$. S adds these information to $\mathcal{L}$ H. S then simulates $\tau_w$ and updates lists ($\mathcal{L}$ R, $\mathcal{L}$ K) as follows:

1. If w in list $\mathcal{L}$ H (S knows if it is due to search pattern $P(\delta, Query, t)$) then fetch corresponding $s_{w_i}$. Else, $s_{w_i} \xleftarrow{\$} \{0, 1\}^\kappa$, $i \leftarrow T_w(s_{w_i})$, $\overline{cnt}_i \leftarrow T_w[i].cnt$ and insert (w, $\mathcal{L}_1(\delta, f)$, $s_{w_i}$) into $\mathcal{L}$ H.

2. If $\perp = \mathcal{L}$ K(i, $\overline{cnt}_i$) then $r_i \leftarrow \{0, 1\}^\kappa$ and insert $(r_i, i, \overline{cnt}_i)$ into $\mathcal{L}$ K. Else, $r_i \leftarrow \mathcal{L}$ K(i, $\overline{cnt}_i$).

3. If $\overline{cnt}_i > 1$ then $\bar{r}_i \leftarrow \mathcal{L}$ K(i||$\overline{cnt}_i$−1) and $\tau_w \leftarrow (i, r_i, \bar{r}_i)$. Else, $\tau_w \leftarrow (i, r_i)$.

4. $T_w[i].cnt \leftarrow \overline{cnt}_i + 1$.

5. Given $\mathcal{L}_2(\delta, f, w, t)$, S knows $id_w = (y_1, \ldots, y_l)$. Set $I'[i, y_j] \leftarrow 1$, $j=1, \ldots, l$, and $\{I'[i, j] \leftarrow 0\}_{j=1, j \in \{y_1, \ldots, y_l\}}$.

6. If $((\tau_w = (i, r_i) \vee I[i, j].st)=1)$ then $V[i, j] \leftarrow I[i, j] \oplus I[i, j]$ and insert tuple $(r_i||j||st_j, V[i, j])$ into $\mathcal{L}$ R for $j=1, \ldots, n$, where $st_j \leftarrow T_f[j].cnt$.

7. $I[i, *].st \leftarrow 0$.

8. $I[i, j] \leftarrow I'[i, j] \oplus RO(r_i||j||st_j)$, where $st_j \leftarrow T_f[j].cnt$ for $j=1, \ldots, n$.

9. Output $\tau_w$ and insert (w, $\tau_w$) into $\mathcal{L}$ H.

Given any $\Delta(\delta, f, w_i, t)$, S simulates the output of RO(.) such that $\tau_w$ always produces the correct search result for $id_w \leftarrow Search(\tau_w, \gamma)$. S needs to simulate the output of RO(.) for two conditions (as in III—Step 6): (i) The first search of $w_i$ (i.e., $\tau_w = (i, r_i)$), since S did not know $\delta$ during the simulation of ($\gamma$, c). (ii) If any file $f_{id_j}$ containing $w_i$ has been updated after the last search on $w_i$ (i.e., $I[i, j].st=1$), since S does not know the content of update. S sets the output of RO(.) for those cases by inserting tuple $(r_i||j||st_j, V[i, j])$ into $\mathcal{L}$ R (as in III—Step 6). In other cases, S just invokes RO(.) with $(r_i||j||st_j)$, which consistently returns previously inserted bit from $\mathcal{L}$ R (as in III—Step 8).

During the first search on $w_i$, each RO(.) output $V[i, j]=RO(r_i||j||st_j)$ has the correct distribution, since $I[i, *] \in \gamma$ has random uniform distribution (II—Correctness and Indistinguishability argument). Let $J=(j_1, \ldots, j_l)$ be the indexes of files containing $w_i$, which are updated after the last search on $w_i$. If $w_i$ is searched then each RO(.) output $V[i, j]=RO(r_i||j||st_j)$ has the correct distribution, since $\tau_w \leftarrow (I', j)$ for indexes $j \in J$ has random uniform distribution (IV—Correctness and Indistinguishability argument). Given that S's $\tau_w$ always produces correct $id_w$ for given $\Delta(\delta, f, w_i, t)$, and relevant values and RO(.) outputs have the correct distribution as shown, A does not abort during the simulation due to S's search token. The probability that A queries RO(.) on any $(r_i\|j\|st_j)$ before him queries S on $\tau_w$ is negligible $$\left(\text{i.e., } \frac{1}{2^\kappa}\right),$$

and therefore S does not abort due to A's search query.

IV. Simulate $(\tau_f, \tau_f')$:

Assume that S receives an update request Query=($\langle$ Add, $|c_{id_j}|\rangle$, Delete) at time t. S simulates update tokens $(\tau_f, \tau_f')$ as follows:

1. If $id_j$ in $\mathcal{L}$ H then fetch its corresponding $(s_{f_j}, j)$ from $\mathcal{L}$ H, else set $s_{f_j} \xleftarrow{\$} \{0, 1\}^\kappa$, $j \leftarrow T_f(s_{f_j})$ and insert $(s_{f_j}, j, f_{id_j})$ into $\mathcal{L}$ H.
2. $T_f[j].cnt \leftarrow T_f[j].cnt+1$, $cnt_j \leftarrow T_f[j].cnt$.
3. If $\bot = \mathcal{L}$ K(i, $\overline{cnt}_i$) then $r_i \leftarrow \{0, 1\}^\kappa$ and insert $(r_i, i, \overline{cnt}_j)$ into $\mathcal{L}$ K, where $\overline{cnt}_i \leftarrow T_w[i].cnt$ for $i=1, \ldots, m$.
4. I'[i]$\leftarrow$RO($z_i$), where $z_i \xleftarrow{\$} \{0, 1\}^{2\kappa}$ for $i=1, \ldots, m$.
5. I[*, j]$\leftarrow$(I')$^T$ and I[*, j].st$\leftarrow$1.
6. If Query=$\langle$ Add, $|c_{id_j}|\rangle$, simulate $c_j \leftarrow \mathcal{E}$.Enc$_k(\{0\}^{|c_{id}|})$, add $c_j$ into c, set $\tau_f \leftarrow$(I', j) output $(\tau_f, j)$. Else set $\tau_f' \leftarrow$(I', j), remove $c_j$ from c and output $\tau_f'$.

Correctness and Indistinguishability:

Given any $(\tau_f, \tau_f')$ for a file $f_{id_j}$, A checks the correctness of update by searching all search terms W=$(w_{i_1}, \ldots, w_{i_j})$ included $f_{id_j}$. Since S is given access pattern $\Delta(\delta, f, w \, t)$ for a search query (which captures the last update before the search), the search operation always produces a correct result after an update (see III—Correctness and Indistinguishability argument). Hence, S's update tokens are correct and consistent.

It remains to show that $(\tau_f, \tau_f')$ have the correct probability distribution. In real algorithm, $st_d$ of file $f_{id_j}$ is increased for each update as simulated in IV—Step 2. If $f_{id_j}$ updated after $w_i$ is searched, a new $r_i$ is generated for $w_i$ as simulated in IV—Step 3 ($r_i$ remains the same for consecutive updates but $st_j$ is increased). Hence, the real algorithm invokes H( ) with a different input $(r_i\|j\|st_j)$ for $i=1, \ldots, m$. S simulates this step by invoking RO(.) with $z_i$ and I'[i] RO($z_i$), for $i=1, \ldots, m$. $(\tau_f, \tau_f')$ have random uniform distribution, since has random uniform distribution and update operations are correct and consistent as shown. $c_j$ has the correct distribution, since Enc is an IND-CPA cipher. Hence, A does not abort during the simulation due to S's update tokens. The probability that A queries RO(.) on any $z_i$ before generation of queries for S on $(\tau_f, \tau_f')$ is negligible $$\left(\text{i.e., } \frac{1}{2^{2\kappa}}\right),$$

and therefore S also does not abort due to A's update query.

V. Final Indistinguishability Argument:

$(s_{w_i}, s_{f_j}, r_i)$ for $i=1, \ldots, m$, and $j=1, \ldots, n$ are indistinguishable from real tokens and keys, since they are generated by PRFs that are indistinguishable from random functions. Enc is a IND-CPA scheme, the answers returned by S to A for RO(.) queries are consistent and appropriately distributed, and all query replies of S to A during the simulation are correct and indistinguishable as discussed in I-IV Correctness and Indistinguishability arguments. Hence, for all PPT adversaries, the outputs of Real$_A(\kappa)$ and that of an Ideal$_{A,S}(\kappa)$ experiment are negligibly close:

$$|Pr[\text{Real}_A(\kappa)=1] - Pr[\text{Ideal}_{A,S}(\kappa)=1]| \leq \text{neg}(\kappa)$$

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of searching encrypted data comprising:
generating with a client computing device a search index identifier using a predetermined encryption process to generate an encrypted key using a first secret cryptographic key and a predetermined hash function to generate the search index identifier from an encrypted search term;
generating with the client computing device a first single use cryptographic key with reference to a second secret cryptographic key, and a first counter value associated with the search index identifier;
generating with the client computing device a second single use cryptographic key with reference to a second secret cryptographic key, and a second counter value associated with the search index identifier;
transmitting with the client computing device the search index identifier, first single use cryptographic key, and second single use cryptographic key to a server computing device;
identifying with the server computing device a first set of encrypted data in a search table with reference to the search index identifier;
generating with the server computing device a set of decrypted data from the first set of encrypted data, the server computing device using the first single use cryptographic key to decrypt a first portion of the first set of encrypted data and the server computing device using the second single use cryptographic key to decrypt a second portion of the first set of encrypted data;
identifying with the server at least one encrypted file stored in a memory associated with the server computing device with reference to the set of decrypted data in the search table, the set of decrypted data comprising first decrypted set of data and second decrypted set of data, the at least one encrypted file containing an encrypted representation of the search term;
transmitting with the server computing device at least one file identifier corresponding to the at least one identified encrypted file to the client computing device;
requesting with the client computing device a copy of one encrypted file stored on the server computing device with reference to the at least one file identifier transmitted from the server computing device;
transmitting with the server computing device the copy of the one encrypted file to the client computing device;
decrypting with the client computing device the copy of the one encrypted file using a symmetric cryptographic key stored only in a memory of the client computing device;
generating with the server computing device a second set of encrypted data from the decrypted set of data from the search table and the second single use cryptographic key; and storing the second set of encrypted data in the search table associated with the search index identifier to replace the first set of encrypted data in the search table.

2. The method of claim 1 further comprising:

generating with the client computing device a third single use cryptographic key with reference to the second secret cryptographic key, and a third counter value associated with the search index identifier;

transmitting with the client computing device the search index identifier, second single use cryptographic key, and third single use cryptographic key to the server computing device;

identifying with the server computing device the second set of encrypted data in the search table with reference to the search index identifier;

generating with the server computing device another set of decrypted data from the second set of encrypted data, the server computing device using the second single use cryptographic key to decrypt a first portion of the second set of encrypted data and the server computing device using the third single use cryptographic key to decrypt a second portion of the second set of encrypted data;

identifying with the server computing device the at least one encrypted file stored in the memory associated with the server computing device with reference to the other decrypted set of data in the table, the at least one encrypted file containing an encrypted representation of the search term;

transmitting with the server computing device the file identifiers corresponding to the identified encrypted files to the client computing device; and encrypting with the server computing device the set of decrypted data from the search table using the third single use encryption key.

3. The method of claim 1 further comprising:

transmitting with the server computing device copies of the at least one encrypted file to the client computing device; and decrypting with the client computing device the contents of the at least one encrypted file using a symmetric cryptographic key stored only in a memory of the client computing device.

4. The method of claim 1, the generation of the first decrypted set of data from the search table further comprising:

identifying with the server computing device the first set of encrypted data as a plurality of encrypted entries, each encrypted entry corresponding to one encrypted file in the plurality of encrypted files;

identifying with the server computing device a first entry in the plurality of encrypted entries as corresponding to a file that has not been updated since a previous search request with reference to a state bit associated with the first entry in the search table having a first value;

decrypting with the server computing device the first entry using the first single use cryptographic key in response to the state bit of the first entry having the first value;

identifying with the server computing device a second entry in the plurality of encrypted entries as corresponding to a file that has been updated since a previous search request with reference to another state bit associated with the second entry in the search table having a second value;

decrypting with the server computing device the second entry using the second single use cryptographic key in response to the state bit of the second entry having the second value; and setting with the server computing device the state bit of the second entry to the first value after identifying that the second entry corresponds to the file that has been updated.

5. The method of claim 4, the decryption of each entry in the plurality of entries further comprising:

decrypting with the server computing device at least two entries in the plurality of encrypted entries concurrently using a plurality of processing devices in the server computing device.

6. The method of claim 1 wherein the first single use cryptographic key and the second single use cryptographic key are cryptographic keys corresponding to a symmetric block cipher and the generation of the set of decrypted data further comprising: generating with the server computing device the set of decrypted data from the first set of encrypted data with the first single use cryptographic and the second single use cryptographic key using a counter mode block cipher decryption scheme, the server computing device using the first single use cryptographic key to decrypt a first block of the first set of encrypted data and the server computing device using the second single use cryptographic key to decrypt a second block of the first set of encrypted data.

7. The method of claim 6 further comprising:

identifying with the server computing device the first set of encrypted data as a plurality of encrypted blocks, each encrypted block corresponding to a set of encrypted files in the plurality of encrypted files;

identifying with the server computing device a first block in the plurality of encrypted blocks as corresponding to a set of encrypted files that have not been updated since a previous search request with reference to a state bit associated with the first block in the memory of the server having a first value;

decrypting with the server computing device the first block using the first single use cryptographic key in response to the state bit of the first block having the first value;

identifying with the server computing device a second block in the plurality of encrypted blocks as corresponding to another set of files including at least one file that has been updated since a previous search request with reference to another state bit associated with the second block in the memory of the server having a second value;

decrypting with the server computing device the second block using the second single use cryptographic key in response to the state bit of the second block having the second value; and setting with the server computing device the state bit of the second block to the first value after identifying that the second block includes at least one file that has been updated.

8. A method of updating an encrypted search table comprising:

identifying with a client computing device a plurality of search terms in a file stored in a memory of the client computing device;

generating with the client computing device a plurality of encrypted search terms from the plurality of search terms using a first cryptographic key;

generating with the client computing device a plurality of search index identifiers corresponding to each search term in the plurality of encrypted search terms using a predetermined hash function, each search index identifier in the plurality of search index identifiers corresponding to a set of entries in an encrypted search table;

generating with the client computing device a plain-text set of data corresponding to a plurality of entries for the file in the search table, the set of entries including a first plurality of entries corresponding to the search index identifiers having a first value indicating that a corresponding search term is present in the file and a second plurality of entries having a second value indicating that a corresponding search term is not present in the file;

generating with the client computing device an encrypted set of data from the plain-text set of data corresponding to entries for the file in the search table, the generating of the encrypted set of data further comprising:

generating with the client computing device an encrypted file identifier of the file with reference to a plain-text file identifier of the file;

generating with the client computing device a file index identifier for the file with reference to the encrypted file identifier and the predetermined hash function;

incrementing with the client computing device a counter associated with the file;

generating with the client computing device an output of a random oracle from an input comprising a first single use cryptographic key associated with a search index identifier of one entry in the plain-text set of data, the file index identifier, and the counter; and generating with the client computing device an encrypted entry corresponding to the one entry with reference to a plain-text value of the one entry exclusive-ored by the output of the random oracle;

encrypting with the client computing device contents of the file using a file encryption/decryption key stored only in a memory associated with the client computing device;

encrypting with the client computing device a file identifier of the file;

transmitting with the client computing device the encrypted set of data, the encrypted file identifier, and the encrypted file to a server computing device;

updating with the server computing device the search table with the encrypted set of data in a memory associated with the server computing device; and storing with the server computing device the encrypted file in the memory associated with the server computing device.

9. The method of claim 8, the updating of the search table further comprising:

generating with the server computing device a file index identifier corresponding to the encrypted file identifier with the predetermined hash function; and storing with the server computing device the encrypted set of data for the file in the search table at an index corresponding to the file index identifier.

10. The method of claim 8 further comprising:

transmitting with the server computing device a global counter corresponding to a counter mode encryption scheme for encrypting blocks of one or more rows in the search table and a block of a row of the search table corresponding to one search term to the client computing device, the block including an entry in the row corresponding to the encrypted file identifier and to at least one other file;

decrypting with the client computing device the block of the row of the search table using a first single use key and a counter value associated with the block to generate a decrypted block;

updating one entry in the decrypted block corresponding to the encrypted file identifier with one entry in the plain-text set of data corresponding to the plurality of entries for the file in the search table;

encrypting with the client computing device the block of the row of the search table including the updated entry using a second single use key and the global counter value to generate an updated encrypted block;

transmitting with the client computing device the updated encrypted block and the encrypted filed identifier to the server computing device; and updating with the server computing device the row of the search table with the updated encrypted block.

11. The method of claim 10 further comprising: incrementing with the server computing device the global counter prior to transmission of the global counter and the block of row of the search table to the client computing device.

12. The method of claim 8, the encryption with the client computing device of the set of data from the plain-text set of data corresponding to entries for the file in the search table further comprising:

encrypting with the client computing device at least two entries in the plain-text set of data concurrently using a plurality of processing devices in the client computing device.

\* \* \* \* \*